United States Patent
Aonuma et al.

(10) Patent No.: US 9,891,702 B2
(45) Date of Patent: Feb. 13, 2018

(54) HEAD-MOUNTED DISPLAY DEVICE, METHOD OF CONTROLLING HEAD-MOUNTED DISPLAY DEVICE, AND COMPUTER PROGRAM

(71) Applicant: SEIKO EPSON CORPORATION, Tokyo (JP)

(72) Inventors: Masashi Aonuma, Shiojiri (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/952,185

(22) Filed: Nov. 25, 2015

(65) Prior Publication Data

US 2016/0170480 A1 Jun. 16, 2016

(30) Foreign Application Priority Data

Dec. 10, 2014 (JP) ................................. 2014-249673

(51) Int. Cl.
*G06F 3/01* (2006.01)
*G02B 27/01* (2006.01)
(Continued)

(52) U.S. Cl.
CPC .......... *G06F 3/011* (2013.01); *G02B 27/0172* (2013.01); *G06F 3/017* (2013.01);
(Continued)

(58) Field of Classification Search
CPC combination set(s) only.
See application file for complete search history.

(56) References Cited

U.S. PATENT DOCUMENTS 6,411,326 B1 6/2002 Tabata
6,738,040 B2 5/2004 Jahn et al.
(Continued)

FOREIGN PATENT DOCUMENTS

EP 1 182 541 A2 2/2002
EP 2 600 331 A1 6/2013
(Continued)

OTHER PUBLICATIONS

Apr. 12, 2016 extended Search Report issued in European Patent Application No. 15198728.6.
(Continued)

*Primary Examiner* — Robin J Mishler
(74) *Attorney, Agent, or Firm* — Oliff PLC

(57) ABSTRACT

A head-mounted display device with which a user can visually recognize a virtual image and an outside scene includes an image display unit that causes the user to visually recognize the virtual image, a specifying unit that specifies procedure information, which is information representing a series of action procedures, using a virtual object to be displayed in addition to a real world, the specifying unit specifying at least a singularity of kind of the procedure information out of a plurality of kinds of the procedure information prepared in advance, and an acquiring unit that acquires the specified procedure information and incidental procedure information, which is the procedure information incidental to the procedure information before and after the specified procedure information and causes the image display unit to form the virtual image representing the virtual object included in at least one of the acquired procedure information and the incidental procedure information.

16 Claims, 11 Drawing Sheets

(51) Int. Cl.
*G06F 3/16* (2006.01)
*G09B 5/06* (2006.01)
*G09B 19/00* (2006.01)

(52) U.S. Cl.
CPC ............... *G06F 3/167* (2013.01); *G09B 5/06* (2013.01); *G09B 19/00* (2013.01); *G02B 2027/014* (2013.01); *G02B 2027/0138* (2013.01); *G05B 2219/32014* (2013.01)

(56) References Cited

U.S. PATENT DOCUMENTS

| | | | |
|---|---|---|---|
| 9,535,248 B2 | 1/2017 | Hirabayashi et al. | |
| 2002/0089544 A1* | 7/2002 | Jahn | G06F 3/011 715/778 |
| 2005/0031166 A1 | 2/2005 | Fujimura et al. | |
| 2013/0083063 A1 | 4/2013 | Geisner et al. | |
| 2013/0088413 A1 | 4/2013 | Raffle et al. | |
| 2014/0049558 A1* | 2/2014 | Krauss | G06F 3/011 345/633 |
| 2014/0168266 A1 | 6/2014 | Kimura | |
| 2014/0176603 A1 | 6/2014 | Kumar et al. | |
| 2014/0310595 A1 | 10/2014 | Acharya et al. | |
| 2015/0103174 A1 | 4/2015 | Emura et al. | |
| 2016/0086306 A1 | 3/2016 | Nishimaki et al. | |
| 2016/0330410 A1 | 11/2016 | Sako et al. | |
| 2017/0109916 A1* | 4/2017 | Kurz | G06T 11/60 |

FOREIGN PATENT DOCUMENTS

| | | |
|---|---|---|
| JP | H08-75418 A | 3/1996 |
| JP | 2002-230086 A | 8/2002 |
| JP | 2007-514211 A | 5/2007 |
| JP | 2012-196241 A | 10/2012 |
| JP | 5764994 B2 | 8/2015 |

OTHER PUBLICATIONS

Jan. 19, 2017 Office Action Issued in U.S. Appl. No. 14/919,231.
U.S. Appl. No. 14/919,231, filed Oct. 21, 2015 in the name of Aonuma et al.
Anonymous: "Prefetching—Wikipedia", Apr. 23, 2013 XP055363478, Retrieved from the Internet: URL:https:Ilde.wikipedia.org/w/index.php?title=Prefetching&0Idid=117815937.

* cited by examiner

| ID | TAG INFORMATION ||||||||||| DISPLAY CONTROL INFORMATION ||
| | CATEGORY ||| SOURCE | REALIZATION CONDITIONS | EVALUA-TION | REFER-ENCE | EDITING INFORMATION | 3D MODEL | SENSOR DETECTION VALUE | ADDITIONAL INFORMATION | REPRESENT-ATIVE | PRIOR SCENARIO | POSTERIOR SCENARIO |
| | LARGE | MEDIUM | SMALL | | | | | | | | | | | |
| --- | --- | --- | --- | --- | --- | --- | --- | --- | --- | --- | --- | --- | --- | --- |
| 001 | DISH | SEA BREAM | SASHIMI | XXXX | KITCHEN KNIFE, CHOPPING BOARD, RADISH, HORSE RADISH | 51 | LINK | XXXXX | XXXXX | XXXXX | XXXXX | 1 | (1) CHOICE (2) FILLETING | NONE |
| 002 | DISH | SEA BREAM | TEMPURA | XXXX | TEMPURA POT, FLOUR, SALT, RAPE-SEED OIL | 115 | NONE | XXXXX | XXXXX | XXXXX | XXXXX | 1 | (1) CHOICE (2) CUT OPEN | NONE |
| 003 | DISH | SEA BREAM | HARD-BOILED | XXXX | POD, SUGAR, SOY SAUCE | 67 | 015 | XXXXX | XXXXX | XXXXX | XXXXX | 1 | (1) CHOICE (2) REMOVE HEAD AND ENTRAILS | NONE |
| 004 | DISH | SEA BREAM | HARD-BOILED | XXXX | FRYING PAN, SUGAR, SOY SAUCE | 110 | NONE | XXXXX | XXXXX | XXXXX | XXXXX | 1 | (1) CHOICE (2) REMOVE HEAD AND ENTRAILS | NONE |
| 005 | DISH | SEA BREAM | CHOICE | XXXX | NONE | 21 | NONE | XXXXX | XXXXX | XXXXX | XXXXX | 0 | — | — |
| 006 | DISH | SEA BREAM | FILLETING | XXXX | KITCHEN KNIFE, CHOPPING BOARD | 120 | NONE | XXXXX | XXXXX | XXXXX | XXXXX | 0 | — | — |
| 007 | DISH | SEA BREAM | FILLETING | XXXX | KITCHEN KNIFE, CHOPPING BOARD, SCALE REMOVER | 5 | LINK | XXXXX | XXXXX | XXXXX | XXXXX | 0 | — | — |
| 008 | DISH | SEA BREAM | FILLETING | XXXX | CHOPPING BOARD, SCALE REMOVER, FILLETING PEELER | 55 | 099 | XXXXX | XXXXX | XXXXX | XXXXX | 0 | — | — |
| 009 | DISH | SEA BREAM | CUT OPEN | XXXX | KITCHEN KNIFE, CHOPPING BOARD | 98 | NONE | XXXXX | XXXXX | XXXXX | XXXXX | 0 | — | — |
| 010 | DISH | SEA BREAM | REMOVE HEAD AND ENTRAILS | XXXX | KITCHEN KNIFE, CHOPPING BOARD | 51 | NONE | XXXXX | XXXXX | XXXXX | XXXXX | 0 | — | — |
| 011 | DISH | SARDINE | SASHIMI | XXXX | KITCHEN KNIFE, CHOPPING BOARD, RADISH, HORSE RADISH | 117 | NONE | XXXXX | XXXXX | XXXXX | XXXXX | 1 | (1) CHOICE (2) FILLETING | NONE |
| … | … | … | … | … | … | … | … | … | … | … | … | … | … | … |

FIG. 9

HEAD-MOUNTED DISPLAY DEVICE, METHOD OF CONTROLLING HEAD-MOUNTED DISPLAY DEVICE, AND COMPUTER PROGRAM

BACKGROUND

1. Technical Field

The present invention relates to a head-mounted display device.

2. Related Art

There is known a work supporting system that teaches a procedure of a series of actions (hereinafter simply referred to as "action procedure" as well) to a user. For example, JP-A-2002-230086 (Patent Literature 1) describes a technique for combining an action of an object photographed as a video and a schematic moving image of a portion particularly needed to be explained in detail in the action of the object and displaying a combined image on one screen to realize work support.

Examples of the related art are also described in JP-A-8-75418 (Patent Literature 2) and JP-T-2007-514211 (Patent Literature 3).

On the other hand, there is known a technique called augmented reality (AR) for presenting, using a computer, information in addition to a real object, which is an object present in the real world. In the augmented reality, the information displayed in addition to the real object is called "virtual object" as well. The augmented reality is implemented in, for example, a head mounted display (hereinafter referred to as "HMD" or "head-mounted display device" as well). The HMD picks up an image of an outside scene with a camera, recognizes the image obtained by the image pickup, and generates or acquires a virtual object. In an HMD of a non-transmission type in which a visual field of a user is blocked in a state in which the HMD is mounted, the HMD superimposes a photographed image and a virtual object and causes the user to visually recognize the photographed image and the virtual object. In an HMD of a transmission type in which a visual field of a user is not blocked in a state in which the HMD is mounted, the HMD causes the user to visually recognize only a virtual object. The user wearing the HMD of the transmission type can experience the augmented reality by viewing both of a real object in the real world and the virtual object.

If work support that makes use of such a technique of augmented reality is realized, a user can learn an action procedure represented using a virtual object with respect to a real object present in front of the eyes. Therefore, the technique is extremely useful. In this regard, in the technique described in Patent Literature 1, there has been a problem in that the object and the action of the object photographed as a video are merely manual and have no relation with the real world. Further, in the work support that makes use of the technique of augmented reality, there has been a demand for realizing teaching of a series of action procedures including one action procedure and action procedures related to the action procedure.

SUMMARY

Therefore, in a head-mounted display device that can realize the work support, for example, that makes use of the technique of augmented reality, it has been requested to realize teaching of a series of action procedures including one action procedure and action procedures related to the action procedure.

An advantage of some aspects of the invention is to solve at least a part of the problems described above, and the invention can be implemented as the following forms.

(1) An aspect of the invention provides a head-mounted display device with which a user can visually recognize a virtual image and an outside scene. The head-mounted display device includes: an image display unit configured to cause the user to visually recognize the virtual image; a specifying unit configured to specify procedure information, which is information representing a series of action procedures, using a virtual object to be displayed in addition to the real world, the specifying unit specifying at least a singularity of kind of the procedure information out of a plurality of kinds of the procedure information prepared in advance; and an acquiring unit configured to acquire the specified procedure information and incidental procedure information, which is the procedure information incidental to at least one of kinds of the procedure information before and after the specified procedure information and cause the image display unit to form the virtual image representing the virtual object included in at least one of the acquired procedure information and the incidental procedure information.

With the head-mounted display device according to this aspect, the acquiring unit causes the image display unit to form the virtual image representing the virtual object included in at least one of the acquired procedure information and the incidental procedure information. Therefore, in the head-mounted display device, it is possible to realize work support that makes use of the technique of augmented reality. Further, the acquiring unit acquires the at least one kind of procedure information specified by the specifying unit and the incidental procedure information incidental to the specified procedure information. The incidental procedure information is procedure information incidental to at least one of the kinds of procedure information before and after the specified procedure information, in other words, the procedure information related to the specified procedure information. Therefore, in the head-mounted display device, it is possible to realize teaching of a series of action procedures including one action procedure (the specified procedure information) and an action procedure related to the action procedure (the incidental procedure information).

(2) In the head-mounted display device according to the aspect, the plurality of kinds of procedure information prepared in advance may respectively include tag information concerning the series of action procedures, and the specifying unit may specify the procedure information using the tag information.

With the head-mounted display device according to this aspect, the specifying unit can specify at least one kind of procedure information out of the plurality of kinds of procedure information using the tag information, which is information concerning the series of action procedures.

(3) In the head-mounted display device according to the aspect, the head-mounted display device may further include an image acquiring unit configured to acquire an outside scene image in a visual field direction of the user in a state in which the head-mounted display device is mounted, and the specifying unit may recognize the acquired outside scene image to acquire information representing a real object present in the real world and may collate the acquired information representing the real object and the tag information to specify the procedure information.

With the head-mounted display device according to this aspect, the specifying unit can specify the procedure information by acquiring, from the outside scene image in the visual field direction of the user, the information representing the real object present in the real world in the visual field direction of the user and collating the acquired information representing the real object and the tag information. That is, the specifying unit can specify the procedure information on the basis of the real object presumed to have already been actually seen by the user.

(4) In the head-mounted display device according to the aspect, the specifying unit may cause the image display unit to form the virtual image representing a list of the tag information and acquire designation of the tag information from the user to specify the procedure information.

With the head-mounted display device according to this aspect, the specifying unit can specify the procedure information on the basis of an intention of the user. The specifying unit causes the image display unit to form the virtual image representing the list of the tag information. Therefore, it is possible to improve convenience of the user in designating the tag information.

(5) In the head-mounted display device according to the aspect, the specifying unit may acquire an input of a keyword from the user and collate the acquired keyword and the tag information to specify the procedure information.

With the head-mounted display device according to this aspect, the specifying unit can specify the procedure information on the basis of an intention of the user. The specifying unit can specify the procedure information on the basis of the keyword acquired from the user. Therefore, it is possible to improve a degree of freedom of an input in the user.

(6) In the head-mounted display device according to the aspect, the head-mounted display device may further include a sound acquiring unit configured to acquire utterance content of the user, and the specifying unit may collate the acquired utterance content and the tag information to specify the procedure information.

With the head-mounted display device according to this aspect, the specifying unit can specify the procedure information on the basis of an intention of the user. The specifying unit can specify the procedure information on the basis of the utterance content of the user. Therefore, it is possible to improve convenience of the user.

(7) In the head-mounted display device according to the aspect, the tag information may include information concerning a source of the series of action procedures, information concerning a realization condition of the series of action procedures, and information concerning evaluation of the series of action procedures, and the specifying unit may further specify the procedure information taking into account at least any one of the information concerning the source, the information concerning the realization condition, and the information concerning the evaluation.

With the head-mounted display device according to this aspect, the specifying unit can specify the procedure information taking into account various kinds of information concerning the series of action procedures. When specifying the procedure information taking into account the information concerning the source, the specifying unit can prioritize, for example, procedure information from a reliable source (e.g., a famous person or a famous company). When specifying the procedure information taking into account the information concerning the realization condition, the specifying unit can prioritize, for example, procedure information having a realization condition conforming to a realization condition that the user can prepare. When specifying the procedure information taking into account the information concerning the evaluation, the specifying unit can prioritize, for example, procedure information with high evaluation.

(8) In the head-mounted display device according to the aspect, the incidental procedure information may be determined taking into account at least any one of information concerning a source of the series of action procedures, information concerning a realization condition of the series of action procedures, and information concerning evaluation of the series of action procedures.

With the head-mounted display device according to this aspect, the incidental procedure information incidental to the specified procedure information can be determined taking into account various kinds of information concerning the series of action procedures. For example, when the incidental procedure information is determined taking into account the information concerning the source, for example, procedure information from a reliable source (e.g., a famous person or a famous company) can be prioritized. When the incidental procedure information is determined taking into account the information concerning the realization condition, for example, procedure information having a realization condition conforming to a realization condition that the user can prepare can be prioritized. When the incidental procedure information is determined taking into account the information concerning the evaluation, for example, procedure information with high evaluation can be prioritized.

(9) In the head-mounted display device according to the aspect, the head-mounted display device may further include: a model generating unit configured to generate a model of the series of action procedures, the model serving as a base of the virtual objet representing the series of action procedures; and a generating unit configured to add the tag information concerning the series of action procedures to the generated model and generate the procedure information.

With the head-mounted display device according to this aspect, the head-mounted display device can generate procedure information including the model serving as the base of the virtual object representing the series of action procedures and the tag information concerning the series of action procedures.

(10) In the head-mounted display device according to the aspect, the head-mounted display device may further include: a sound acquiring unit configured to acquire utterance content of the user; and a user-information storing unit configured to store information concerning the user, and the generating unit may extract the tag information using at least one of the utterance content acquired during the generation of the model and the information concerning the user.

With the head-mounted display device according to this aspect, the generating unit can automatically extract the tag information included in the procedure information using the information (the utterance content) acquired during the generation of the model and the information (the information concerning the user) prepared in advance.

(11) In the head-mounted display device according to the aspect, the generating unit may include, as the tag information, at least any one of information concerning a source of the series of action procedures, information concerning a realization condition of the series of action procedures, information concerning evaluation of the series of action procedures, and information serving for reference in executing the series of action procedures.

With the head-mounted display device according to this aspect, the generating unit can use, as the tag information, various kinds of information concerning the series of action procedures.

Not all of a plurality of constituent elements of the aspects of the invention are essential. To solve a part or all of the problems or to attain apart or all of the effects described in this specification, concerning a part of the plurality of constituent elements, it is possible to appropriately perform a change, deletion, replacement with new other constituent elements, and partial deletion of limited contents. To solve a part or all of the problems or to attain a part or all of the effects described in this specification, it is also possible to combine a part or all of the technical features included in one aspect of the invention with a part or all of the technical features included in the other aspects of the invention to obtain an independent aspect of the invention.

For example, an aspect of the invention can be implemented as a device including a part or all of the three elements, i.e., the image display unit, the specifying unit, and the acquiring unit. That is, the device may or may not include the image display unit. The device may or may not include the specifying unit. The device may or may not include the acquiring unit. Such a device can be implemented as, for example, a head-mounted display device but can also be implemented as devices other than the head-mounted display device. A part or all of the technical features of the aspects of the head-mounted display device explained above can be applied to the device. For example, a device in an aspect of the invention is a device capable of realizing, using a head-mounted display device, work support performed using the technique of augmented reality making use of an existing action procedure represented using a virtual object, the device having an object of realizing teaching of a series of action procedures including one action procedure and action procedures related to the action procedure. However, besides, the device is desired to realize a reduction in the size of the device, improvement of convenience, a reduction in costs in manufacturing of the device, resource saving, facilitation of manufacturing, and the like.

Note that the invention can be implemented in various forms. For example, the invention can be implemented in forms such as a head-mounted display device and a control method for the head-mounted display device, a system including the head-mounted display device, an information processing device and a control method for the information processing device, a system including the information processing device, an image display device and a control method for the image display device, a system including the image display device, a computer program for implementing functions of the methods, the devices, and the systems, a server device for distributing the computer program, and a storage medium having the computer program stored therein.

BRIEF DESCRIPTION OF THE DRAWINGS

The invention will be described with reference to the accompanying drawings, wherein like numbers reference like elements.

FIG. 9 is a diagram showing an example of a scenario storing unit of the server.

DESCRIPTION OF EXEMPLARY EMBODIMENTS

A. Embodiment

A-1. Configuration of an Image Display System

Figure 1:
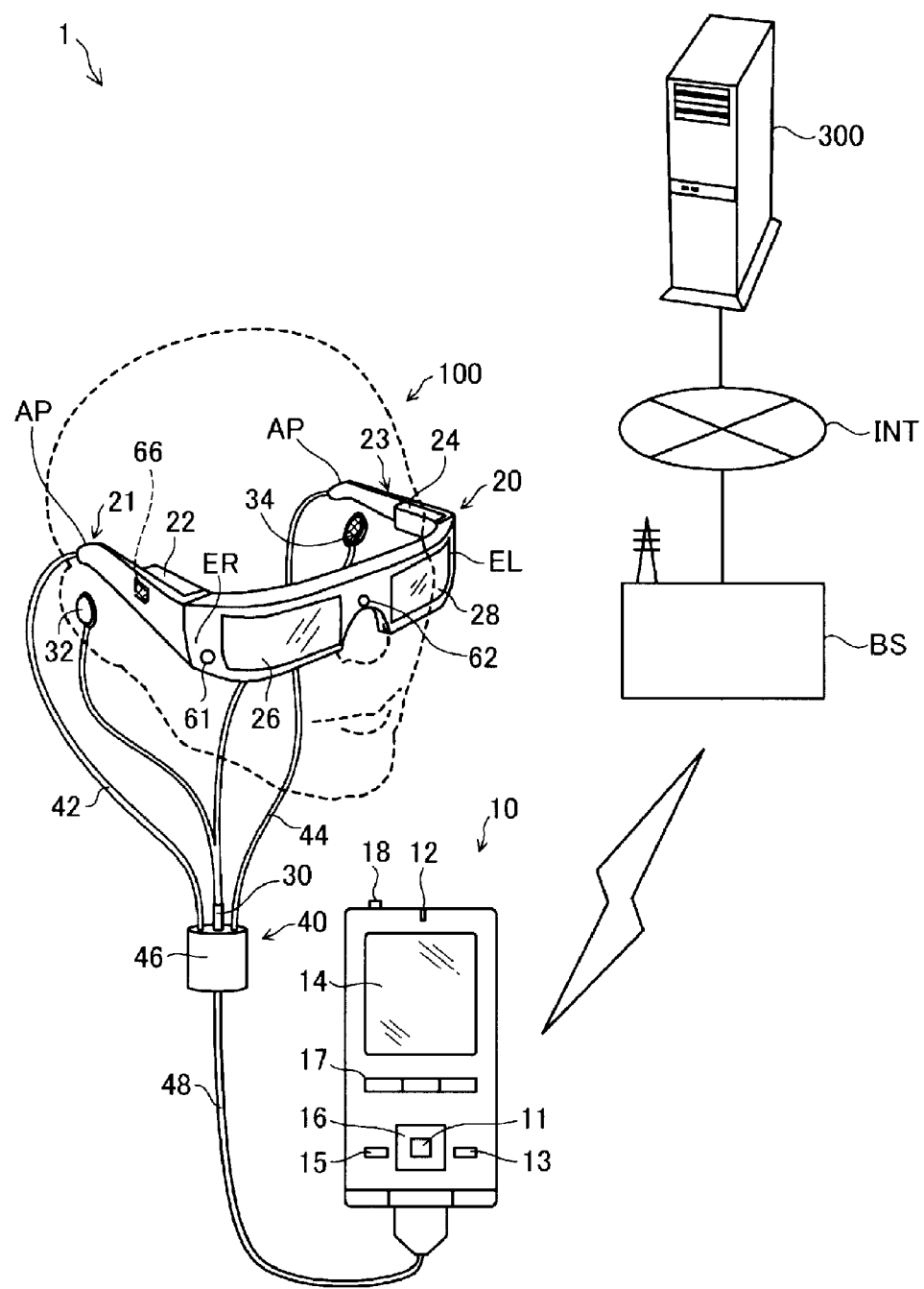
FIG. 1 is an explanatory diagram showing the schematic configuration of an image display system in an embodiment of the invention.

FIG. 1 is an explanatory diagram showing the schematic configuration of an image display system in an embodiment of the invention. An image display system 1 includes a head-mounted display device 100 and a server 300. The image display system 1 in this embodiment can upload a scenario from the head-mounted display device 100 to the server 300 and accumulate the scenario in the server 300 according to scenario registration processing explained below. The image display system 1 in this embodiment can download a scenario from the server 300 to the head-mounted display device 100 and cause the head-mounted display device 100 to display the downloaded scenario according to scenario display processing explained below.

The "scenario" in this embodiment is information used for teaching a series of "action procedures" to a user of the head-mounted display device 100 using a virtual object. The "action procedures" extensively include procedures of actions in a variety of categories. For example, the "action procedures" include, procedures of actions of producers in cooking and sewing, procedures of actions of workers in factory work, and procedures of actions of athletes in sports such as tennis. The action procedures also include procedures of thinking actions not involving motions of the body of the user such as a procedure of thinking such as a thinking process and a procedure of thinking in a learning process. The procedures of the actions may be continuous or may be discontinuous at a fixed interval. The procedures of the actions may include information not representing procedures (models, images, character strings, figures, signs, and the like, sound, any other data, etc.). The scenario functions as "procedure information".

The "virtual object" means information displayed in addition to a "real object", which is an object present in the real world, in augmented reality (AR) processing. The object means any person, any animal or plant, any object (including an artificial object and a natural object), and the like. The real object in this embodiment can include a "real interest object", which is an object in which the user is interested (e.g., that the user is seeing), and a "real background object", which is an object in which the user is not interested (e.g., that the user is not seeing, although the object is within the visual field of the user).

The head-mounted display device 100 is a display device mounted on a head and is called head mounted display (HMD) as well. The HMD 100 in this embodiment is a head mounted display of an optical transmission type with which a user can visually recognize a virtual image and at the same time directly visually recognize an outside scene.

The server 300 accumulates a scenario received from the HMD 100 in the scenario registration processing explained below. The server 300 can accumulate scenarios received from a plurality of HMDs 100. In the scenario display processing explained below, the server 300 extracts at least one scenario from an accumulated or stored plurality of scenarios according to a condition designated from the HMD 100 and transmits the extracted scenario to the HMD 100.

The HMD 100 is connected to the Internet INT by radio or wireless communication via a communication carrier BS. The server 300 is connected to the Internet INT by wired communication. As a result, the HMD 100 and the server 300 are connected to each other by the Internet INT. The communication carrier BS includes transmission and reception antennas, a radio base station, and a telephone exchange.

A-2. Configuration of the Head-Mounted Display Device (the HMD)

A-2-1. Configuration of an Image Display Unit

Figure 2:
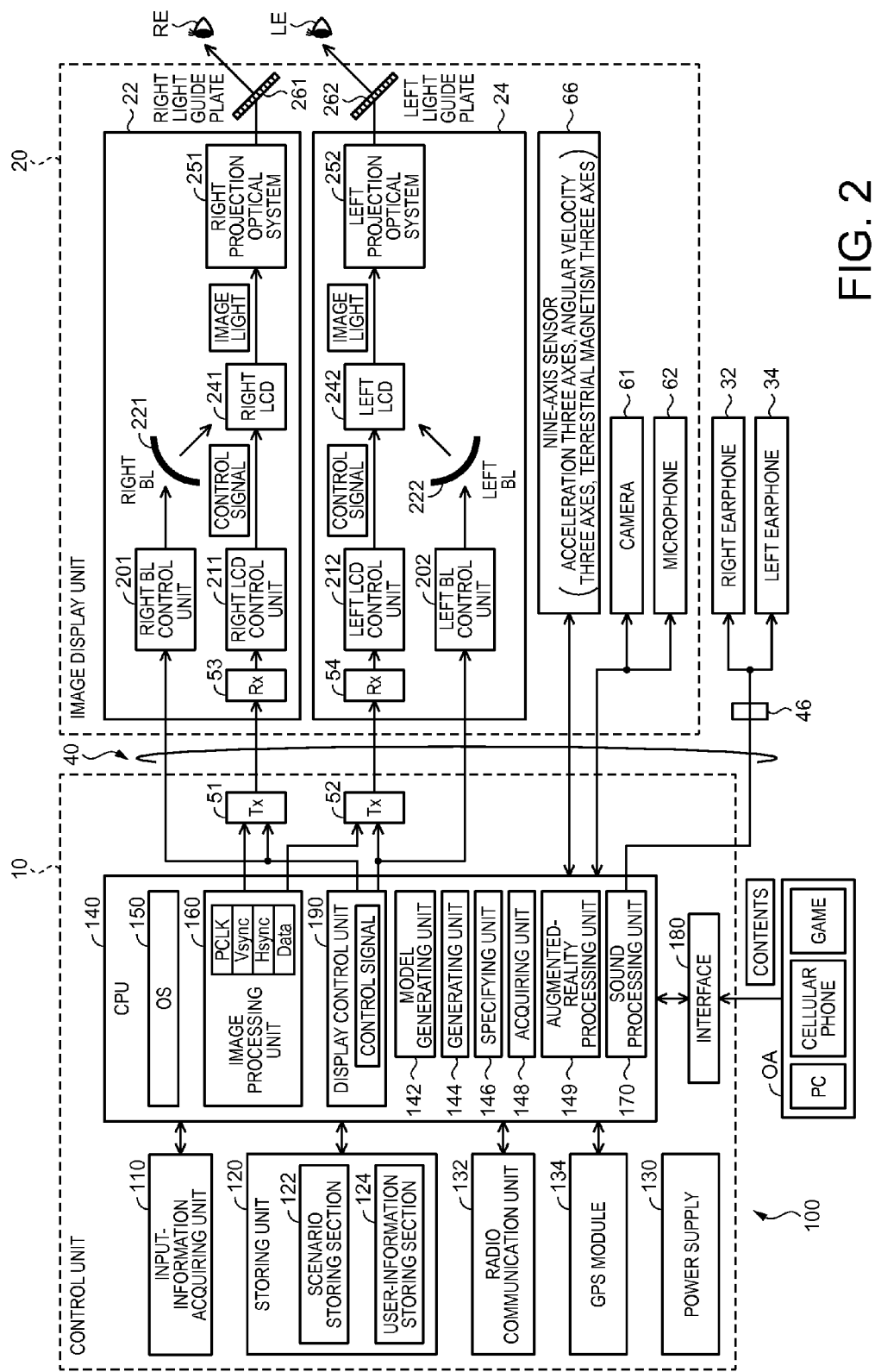
FIG. 2 is a block diagram functionally showing the configuration of an HMD.

FIG. 2 is a block diagram functionally showing the configuration of the HMD 100. As shown in FIG. 1, an image display unit 20 is a wearing body worn on the head of the user. In this embodiment, the image display unit 20 has an eyeglass shape. The image display unit 20 includes a right holding unit 21, a right display driving unit 22, a left holding unit 23, a left display driving unit 24, a right optical-image display unit 26, a left optical-image display unit 28, a camera 61, a microphone 62, and a nine-axis sensor 66. In the following explanation, a positional relation and functions of the units of the image display unit 20 in a state in which the user wears the image display unit 20 are explained.

As shown in FIG. 1, the right optical-image display unit 26 and the left optical-image display unit 28 are disposed to be respectively located in front of the right eye and in front of the left eye of the user. One end of the right optical-image display unit 26 and one end of the left optical-image display unit 28 are connected to each other in a position corresponding to the middle of the forehead of the user. As shown in FIG. 2, the right optical-image display unit 26 includes a right light guide plate 261 and a dimming plate (not shown in the figure). The right light guide plate 261 is formed of a light-transmissive resin material or the like and guides image light output from the right display driving unit 22 to a right eye RE of the user while reflecting the image light along a predetermined optical path. The dimming plate is a thin plate-like optical element and is disposed to cover the front side (a side opposite to the side of the eye of the user) of the image display unit 20. The dimming plate protects the light guide plate 261 and suppresses damage, adhesion of stain, and the like to the light guide plate 261. By adjusting the light transmittance of the dimming plate, it is possible to adjust an amount of external light entering the eye of the user and adjust easiness of visual recognition of a virtual image. The dimming plate may be omitted.

The left optical-image display unit 28 includes a left light guide plate 262 and a dimming plate (not shown in the figure). Details of the left light guide plate 262 and the dimming plate are the same as the details in the right optical-image display unit 26. Note that the right optical-image display unit 26 and the left optical-image display unit 28 are collectively simply referred to as "optical-image display units" as well. Any system can be used in the optical-image display units as long as the optical-image display units form a virtual image in front of the eyes of the user using image light. For example, the optical-image display units may be realized using a diffraction grating or may be realized using a transreflective film.

As shown in FIG. 1, the right holding unit 21 is provided to extend from the other end ER of the right optical-image display unit 26 to a position corresponding to the temporal region of the user. The left holding unit 23 is provided to extend from the other end EL of the left optical-image display unit 28 to a position corresponding to the temporal region of the user. The right holding unit 21 and the left holding unit 23 hold the image display unit 20 on the head of the user like temples of eyeglasses. Note that the right holding unit 21 and the left holding unit 23 are collectively simply referred to as "holding units" as well.

As shown in FIG. 1, the right display driving unit 22 is disposed on the inner side of the right holding unit 21 (a side opposed to the head of the user). The left display driving unit 24 is disposed on the inner side of the left holding unit 23. As shown in FIG. 2, the right display driving unit 22 includes a receiving unit (Rx) 53, a right backlight (BL) control unit 201 and a right backlight (BL) 221 functioning as a light source, a right LCD (Liquid Crystal Display) control unit 211 and a right LCD 241 functioning as a display device, and a right projection optical system 251. Note that the right backlight control unit 201, the right LCD control unit 211, the right backlight 221, and the right LCD 241 are collectively referred to as "image-light generating units" as well.

The receiving unit 53 functions as a receiver for serial transmission between a control unit 10 and the image display unit 20. The right backlight control unit 201 drives the right backlight 221 on the basis of an input control signal. The right backlight 221 is a light emitting body such as an LED (Light Emitting Diode) or an electroluminescence (EL) device. The right LCD control unit 211 drives the right LCD 241 on the basis of a clock signal PCLK, a vertical synchronization signal VSync, a horizontal synchronization signal HSync, image data Data for the right eye input via the receiving unit 53. The right LCD 241 is a transmission liquid crystal panel on which a plurality of pixels are arranged in a matrix shape. The right projection optical system 251 is a collimate lens that changes image light emitted from the right LCD 241 to light beams in a parallel state.

The left display driving unit 24 includes a receiving unit (Rx) 54, a left backlight (BL) control unit 202 and a left backlight (BL) 222 functioning as a light source, a left LCD control unit 212 and a left LCD 242 functioning as a display device, and a left projection optical system 252. Details of the units are the same as the details in the right display driving unit 22. Note that the right display driving unit 22 and the left display driving unit 24 are collectively simply referred to as "display driving units" as well.

As shown in FIG. 1, the camera 61 is a monocular camera disposed in a position corresponding to a lower part of the outer corner of the right eye of the user. The camera 61 picks up or images an outside scene (a scene on the outside) in a front side direction of the image display unit 20, in other words, a visual field direction of the user in a mounted state of the HMD 100 and acquires an outside scene image. The camera 61 is a so-called visible light camera. The outside scene image acquired by the camera 61 is an image representing the shape of an object from visible light radiated from the object. Note that the camera 61 in this embodiment is the monocular camera. However, the camera 61 may be a stereo camera. The camera 61 functions as an "image acquiring unit".

As shown in FIG. 1, the microphone 62 is a microphone disposed in a position corresponding to an upper part of the nose of the user. The microphone 62 functions as a "sound acquiring unit" that acquires sound on the outside. The "sound" means not only voice of a person but also "sound" in a broader sense including machine sound and the like.

As shown in FIG. 1, the nine-axis sensor 66 is disposed in a position corresponding to the temple on the right side of the user. The nine-axis sensor 66 is a motion sensor that detects acceleration (three axes), angular velocity (three axes), and terrestrial magnetism (three axes). Since the nine-axis sensor 66 is provided in the image display unit 20, when the image display unit 20 is worn on the head of the user, the nine-axis sensor 66 can detect and acquire the motion of the head of the user. The motion of the head includes the speed, the acceleration, the angular velocity, the direction, and a change in the direction of the head.

As shown in FIG. 1, the image display unit 20 includes a connecting unit 40 for connecting the image display unit 20 and the control unit 10. The connecting unit 40 includes a main body cord 48 connected to the control unit 10, a right cord 42 and a left cord 44 branching from the main body cord 48, and a coupling member 46 provided at a branching point. A jack for connecting an earphone plug 30 is provided in the coupling member 46. A right earphone 32 and a left earphone 34 extend from the earphone plug 30. The image display unit 20 and the control unit 10 perform transmission of various signals via the connecting unit 40. As the cords of the connecting unit 40, for example, a metal cable and an optical fiber can be adopted.

A-2-2. Configuration of the Control Unit

The control unit 10 is a device for controlling the HMD 100. As shown in FIG. 1, the control unit 10 includes a determination key 11, a lighting unit 12, a display switching key 13, a track pad 14, a luminance switching key 15, a direction key 16, a menu key 17, and a power switch 18. The determination key 11 detects pressing operation and outputs a signal for determining content of the operation in the control unit 10. The lighting unit 12 is realized by, for example, an LED and notifies, with a light emission state thereof, an operation state (e.g., ON/OFF of a light source) of the HMD 100. The display switching key 13 detects pressing operation and outputs, for example, a signal for switching a display mode of a content moving image to 3D and 2D.

The track pad 14 detects operation by a finger of the user on an operation surface of the track pad 14 and outputs a signal corresponding to detected content. As the track pad 14, various types such as an electrostatic type, a pressure type, and an optical type can be adopted. The luminance switching key 15 detects pressing operation and outputs a signal for increasing or reducing the luminance of the image display unit 20. The direction key 16 detects pressing operation on keys corresponding to the upward, downward, left, and right directions and outputs a signal corresponding to detected contents. The power switch 18 detects slide operation of the switch to switch a power supply state of the HMD 100.

As shown in FIG. 2, the control unit 10 includes an input-information acquiring unit 110, a storing unit 120, a power supply 130, a radio communication unit 132, a GPS module 134, a CPU 140, an interface 180, and transmitting units (Tx) 51 and 52. The units are connected to one another by a not-shown bus.

The input-information acquiring unit 110 acquires signals corresponding to operation inputs to the determination key 11, the display switching key 13, the track pad 14, the luminance switching key 15, the direction key 16, the menu key 17, and the power switch 18. The input-information acquiring unit 110 can acquire operation inputs by various methods other than the operation inputs explained above. For example, the input-information acquiring unit 110 may acquire an operation input by a foot switch (a switch operated by the foot of the user). For example, the input-information acquiring unit 110 may acquire a visual line of the user detected by a visual-line detecting unit (not shown in the figure) and an operation input by a command associated with the movement of the eyes. The command may be set to be capable of being added by the user. For example, a gesture of the user may be detected using the cameras 61. An operation input by a command associated with the gesture may be acquired. In the gesture detection, a fingertip of the user, a ring worn on the hand of the user, a medical instrument held by the user, or the like can be used as a mark for motion detection. If the operation input by these methods can be acquired, even in work in which it is difficult for the user to release the hands, the input-information acquiring unit 110 can acquire the operation input from the user.

The storing unit 120 is configured by a ROM, a RAM, a DRAM, a hard disk, or the like. Various computer programs such as an operating system (OS) are stored in the storing unit 120. The storing unit 120 stores a scenario storing section 122 and a user-information storing section 124.

The scenario storing section 122 is a region for storing a scenario generated by the HMD 100 according to the scenario registration processing explained below. In the user-information storing section 124, information concerning the user of the HMD 100 is stored in advance. The information concerning the user can include various kinds of information. For example, besides an identifier (a user ID) attached to distinguish the user from other users, the information concerning the user can include personal information such as a name, sex, an address, and a telephone number. In the user-information storing section 124, information concerning a plurality of users who use the HMD 100 may be stored.

The power supply 130 supplies electric power to the units of the HMD 100. As the power supply 130, for example, a secondary cell can be used.

The radio communication unit 132 performs radio or wireless communication with an external apparatus according to a predetermined radio communication standard. The predetermined radio communication standard is, for example, short distance radio communication exemplified by an infrared ray and a Bluetooth (registered trademark) or a wireless LAN exemplified by IEEE802.11.

The GPS module 134 receives a signal from a GPS satellite to thereby detect the present position of the user of the HMD 100 and generates present position information representing present position information of the user. The present position information can be realized by, for example, coordinates representing latitude and longitude.

The CPU 140 reads out and executes a computer program stored in the storing unit 120 to thereby function as a model generating unit 142, a generating unit 144, a specifying unit 146, an acquiring unit 148, an augmented-reality processing unit 149, an OS 150, an image processing unit 160, a sound processing unit 170, and a display control unit 190.

The model generating unit 142 generates a 3D model in the scenario registration processing explained below. The "3D model" is data of a 3D model concerning a performer of a scenario and real objects (objects present in the real world) around the performer. The 3D model includes a model of a series of action procedures by the performer, in other words, time-series information concerning the motion of the performer. In this embodiment, the "time-series information" is information representing various kinds of information such as models, images, character strings, figures, signs, and the like, sound, and other data continuously or discontinuously at a fixed interval. The 3D model is a portion forming a core of the scenario and is a base of a virtual object representing the series of action procedures. The generating unit 144 generates a scenario from the 3D model generated by the model generating unit 142 in the scenario registration processing explained below.

The specifying unit 146 specifies at least one scenario reflecting an intention of the user out of a plurality of scenarios stored in the server 300. The acquiring unit 148 acquires, from the server 300, the scenario specified by the specifying unit 146 and scenarios incidental to the specified scenario in the scenario display processing explained below. The acquiring unit 148 transmits the acquired scenarios to the augmented-reality processing unit 149 to cause the HMD 100 to display the scenarios. The augmented-reality processing unit 149 executes the augmented reality processing on the scenarios received from the acquiring unit 148 in the scenario display processing explained below. The augmented reality processing is processing for adding a virtual object to a real object actually present in the real world and displaying the virtual object. Details of the units are explained below.

The image processing unit 160 performs signal processing for image display. Specifically, when contents (a video) are input via the interface 180 or the radio communication unit 132, the image processing unit 160 generates the imaged data Data based on the contents. When receiving image data from another functional unit of the HMD 100, the image processing unit 160 sets the received image data as the image data Data. Note that the image processing unit 160 may executes, on the image data Data, image processing such as resolution conversion processing, various kinds of tone correction processing such as adjustment of luminance and chroma, and keystone correction processing. The image processing unit 160 transmits the image data Data, the clock signal PCLK, the vertical synchronization signal VSync, and the horizontal synchronization signal HSync to the image display unit 20 via the transmitting units 51 and 52.

The display control unit 190 generates control signals for controlling the right display driving unit 22 and the left display driving unit 24. Specifically, the display control unit 190 individually controls, using the control signals, ON/OFF of driving of the left and right LCDs 241 and 242 by the left and right LCD control units 211 and 212 and ON/OFF of driving of the left and right backlights 221 and 222 by the left and right backlight control units 201 and 202 to thereby control generation and emission of image lights by the right display driving unit 22 and the left display driving unit 24. The display control unit 190 transmits the control signals to the image display unit 20 via the transmitting units 51 and 52.

The sound processing unit 170 acquires a sound signal included in the contents, amplifies the acquired sound signal, and supplies the amplified sound signal to a not-shown speaker of the right earphone 32 and a not-shown speaker of the left earphone 34.

The interface 180 performs communication with an external apparatus OA according to a predetermined wired communication standard. The predetermined wired communication standard is, for example, Micro USB (Universal Serial Bus), USB, HDMI (High Definition Multimedia Interface; HDMI is a registered trademark), DVI (Digital Visual Interface), VGA (Video Graphics Array), composite, RS-232C (Recommended Standard 232), or wired LAN exemplified by IEEE802.3. As the external apparatus OA, for example, a personal computer PC, a cellular phone terminal, and a game terminal can be used.

Figure 3A:
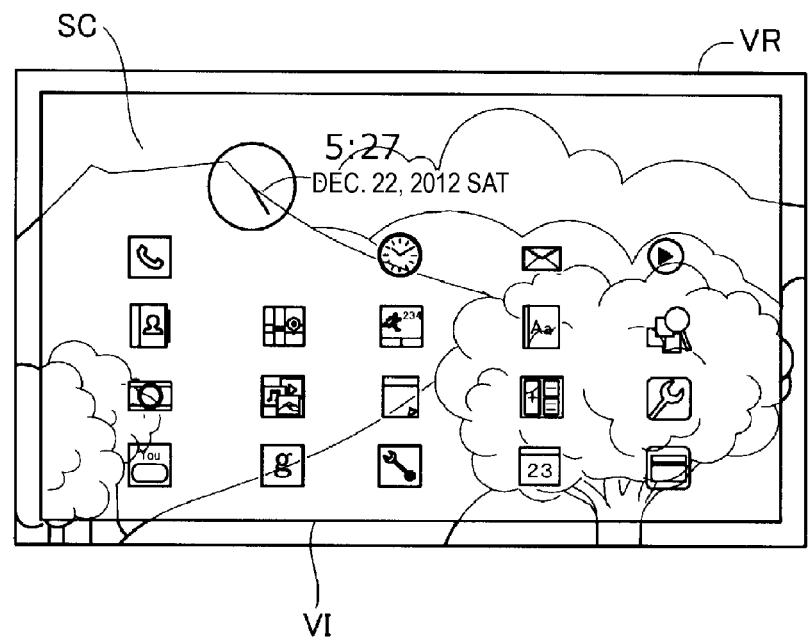
FIGS. 3A and 3B are explanatory diagrams showing examples of virtual images visually recognized by a user.
Figure 3B:
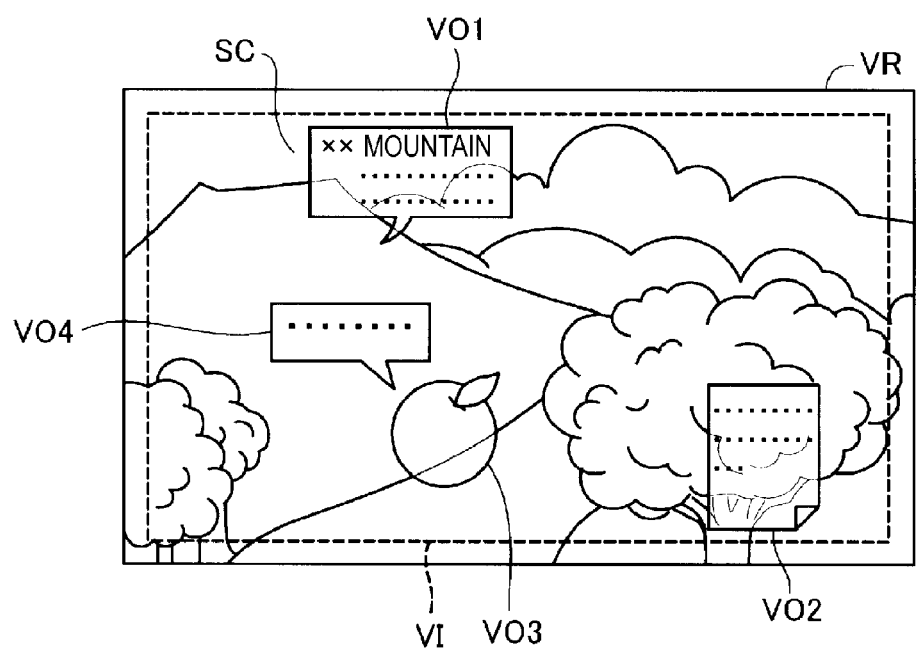

FIGS. 3A and 3B are explanatory diagrams showing examples of virtual images visually recognized by the user. FIG. 3A illustrates a visual field VR of the user obtained when the augmented reality processing is not executed. As explained above, the image lights guided to both the eyes of the user of the HMD 100 are focused on the retinas of the user, whereby the user visually recognizes a virtual image VI. In the example shown in FIG. 3A, the virtual image VI is a standby screen of the OS 150 of the HMD 100. The user visually recognizes an outside scene SC through the right optical-image display unit 26 and the left optical-image display unit 28. In this way, in a portion where the virtual image VI is displayed in the visual field VR, the user of the HMD 100 in this embodiment can view the virtual image VI and the outside scene SC behind the virtual image VI. In a portion where the virtual image VI is not displayed in the visual field VR, the user can directly view the outside scene SC through the optical-image display units.

FIG. 3B illustrates the visual field VR of the user obtained when the augmented reality processing is executed. When the augmented-reality processing unit 149 executes the augmented reality processing, the user visually recognizes the virtual image VI including a virtual object VO1. In the example shown in FIG. 3B, the virtual object VO1 is information in a balloon shape displayed in the vicinity of a mountain (a real object) in the real world in the outside scene SC. A virtual object VO2 is information in a notebook shape displayed to overlap a tree (a real object) in the real world in the outside scene SC. A virtual object VO3 is an image of an apple arranged to overlap a road (a real object) in the real world in the outside scene SC. A virtual object VO4 is an image of an apple, that is, information in a balloon shape displayed in the vicinity of the virtual object VO3. In this way, the user can experience the augmented reality by viewing both of the virtual objects VO1 to VO4 included in the virtual image VI and the real objects in the outside scene SC seen through behind the virtual image VI.

A-3. Configuration of the Server

Figure 4:
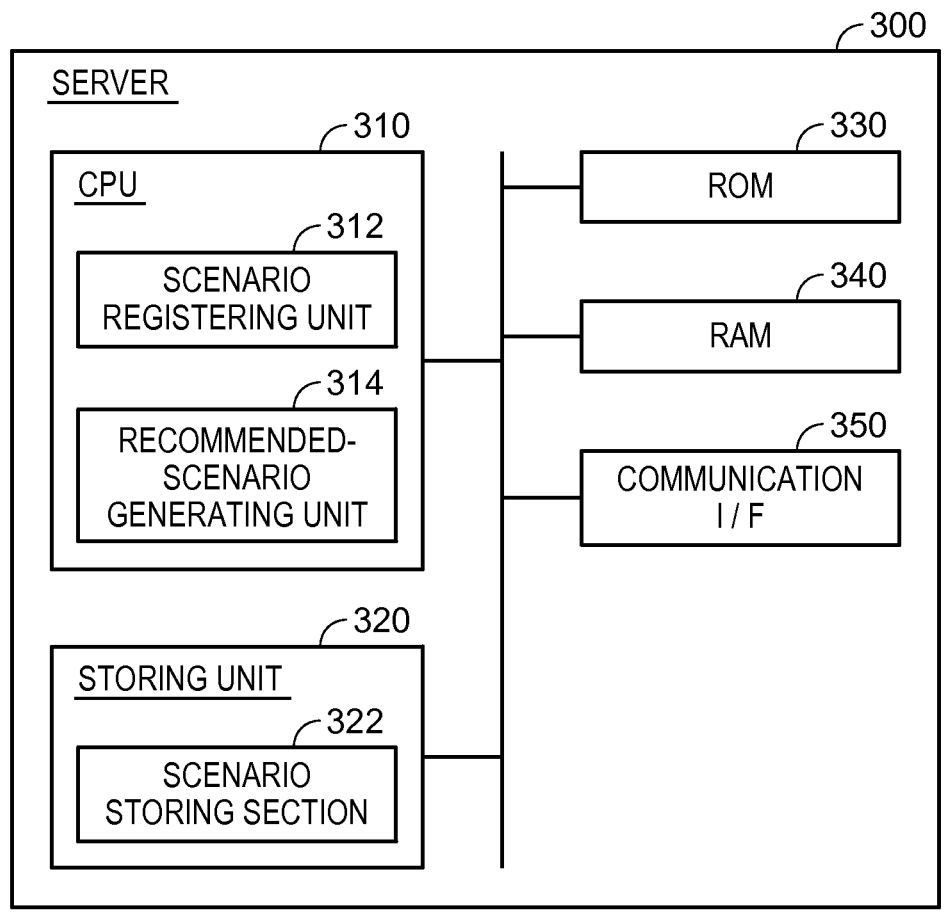
FIG. 4 is a block diagram functionally showing the configuration of a server.

FIG. 4 is a block diagram functionally showing the configuration of the server 300. As shown in FIG. 4, the server 300 includes a CPU 310, a storing unit 320, a ROM 330, a RAM 340, and a communication interface (I/F) 350. The units are connected to one another by a not-shown bus.

The CPU 310 expands a computer program stored in the storing unit 320 or the ROM 330 on the RAM 340 and executes the computer program to thereby control the units of the server 300. Besides, the CPU 310 functions as a scenario registering unit 312 and a recommended-scenario generating unit 314 as well.

The scenario registering unit 312 receives a scenario from the HMD 100 and registers the scenario in the storing unit 320 in the scenario registration processing explained below.

The recommended-scenario generating unit 314 generates, according to a request from the HMD 100, a recommended scenario from a plurality of scenarios stored in the storing unit 320 and transmits the recommended scenario to the HMD 100 in the scenario display processing explained below. The "recommended scenario" is a series of scenarios generated by combining a representative scenario designated by the HMD 100 and scenarios incidental to the representative scenario (hereinafter referred to as "incidental scenarios" as well).

In this embodiment, the "representative scenario" means a scenario for obtaining a final result. As the representative scenario, "sashimi of a sea bream", "service of tennis", and the like are illustrated. The representative scenario functions as "specified procedure information". The "incidental scenarios" mean scenarios that should be incidentally executed before and after the representative scenario. Of the incidental scenarios, the scenario executed before the representative scenario is referred to as "prior scenario" and the scenario executed after the representative scenario is referred to as "posterior scenario". For example, when the representative scenario is "sashimi of a sea bream", "filleting of a sea bream" is illustrated as the prior scenario and "arrangement" is illustrated as the posterior scenario. For example, when the representative scenario is "service of tennis", "selection of a tennis ball" is illustrated as the prior scenario. The incidental scenarios (the prior scenario and the posterior scenario) function as "incidental procedure information".

The storing unit 320 is configured by a ROM, a RAM, a DRAM, a hard disk, or the like. In the storing unit 320, various computer programs such as an operating system (OS) are stored. The storing unit 320 includes a scenario storing section 322. The scenario storing section 322 is a region for storing a scenario acquired by the scenario registration processing explained below. Details are explained below.

A-4. Scenario Registration Processing

Figure 5:
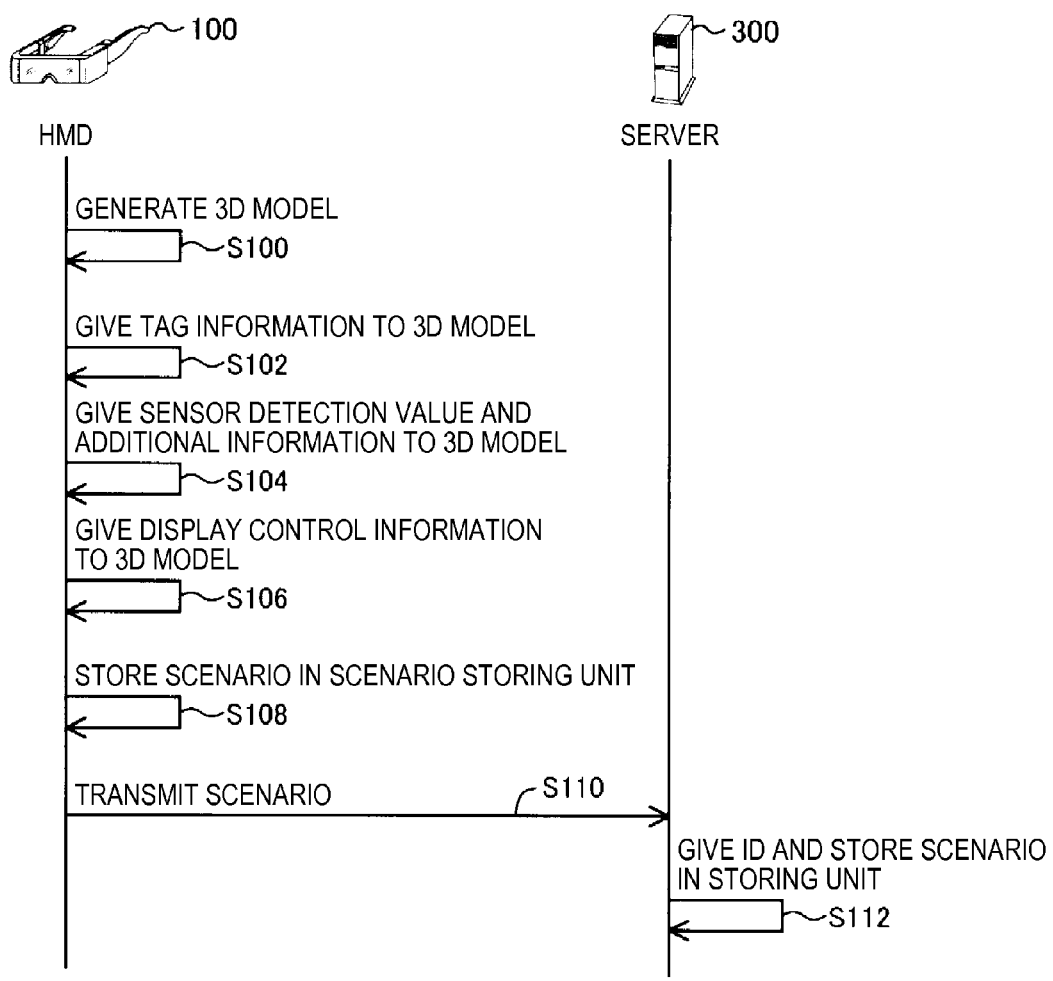
FIG. 5 is a sequence chart showing a procedure of scenario registration processing.

FIG. 5 is a sequence chart showing a procedure of the scenario registration processing. The scenario registration processing is executed by cooperation of the HMD 100 and the server 300. A start trigger of the scenario registration processing can be optionally set. For example, a processing start request from the OS 150 of the HMD 100 or a specific application may be set as the start trigger.

In step S100, the model generating unit 142 of the HMD 100 generates a 3D model. Specifically, the model generating unit 142 generates a 3D model according to procedures a1 to a5 explained below.

(a1) One or more visible light cameras and one or more distance measuring sensors are disposed around a performer. An image pickup range of the visible light cameras and a detection range of the distance measuring sensors are calibrated in advance. In this state, the performer performs a series of actions for generating a 3D model. Note that the visible light cameras are cameras that pick up images of a predetermined outside scene including an object (the performer). The distance measuring sensors are, for example, depth sensors that can measure a distance to a target by irradiating innumerable infrared rays and acquiring the irradiated infrared rays with an infrared camera (or an infrared-ray receiving unit). The number of the visible light camera and the distance measuring sensors is desirably larger because accuracy is improved. Note that the distance to the target may be measured using two or more visible light cameras instead of the distance measuring sensors. The distance measuring sensors and two or more visible light cameras may be properly used according to an environment (a state of external light) during live performance.

(a2) The model generating unit 142 acquires image pickup data by the visible light cameras and measurement data by the distance measuring sensors.

(a3) The model generating unit 142 generates, on the basis of the acquired data, at least a 3D model representing the performer and real objects around the performer. Specifically, the 3D-model generating unit 142 acquires the shapes of objects within an image pickup range of the visible light cameras on the basis of the measurement data of the distance measuring sensors and detects boundary lines of the objects to generate a contour of a 3D model. The 3D-model generating unit 142 colors the inside of the generated contour of the 3D model on the basis of RGB values in the image pickup data of the visible light cameras.

(a4) The 3D-model generating unit 142 associates, in the 3D model, objects having a continuous boundary as "one object" using the 3D model generated in the procedure a3 and the boundary lines of the objects detected in the procedure a3. The 3D-model generating unit 142 performs comparison by pattern matching or a statistical identification method using models of parts (e.g., the hands, the feet, and the head) of a human body stored in advance to recognize, as "human body", a set of the objects identified as one object.

(a5) The 3D-model generating unit 142 generates, as "data of the 3D model", a set of the data of the 3D model generated in the procedure a3, boundary line data representing the boundary lines of the objects detected in the procedure a3, association data by the procedure a4 indicating that the objects are one object, and association data by the procedure a4 indicating that the set of the objects is the human body.

Figure 6:
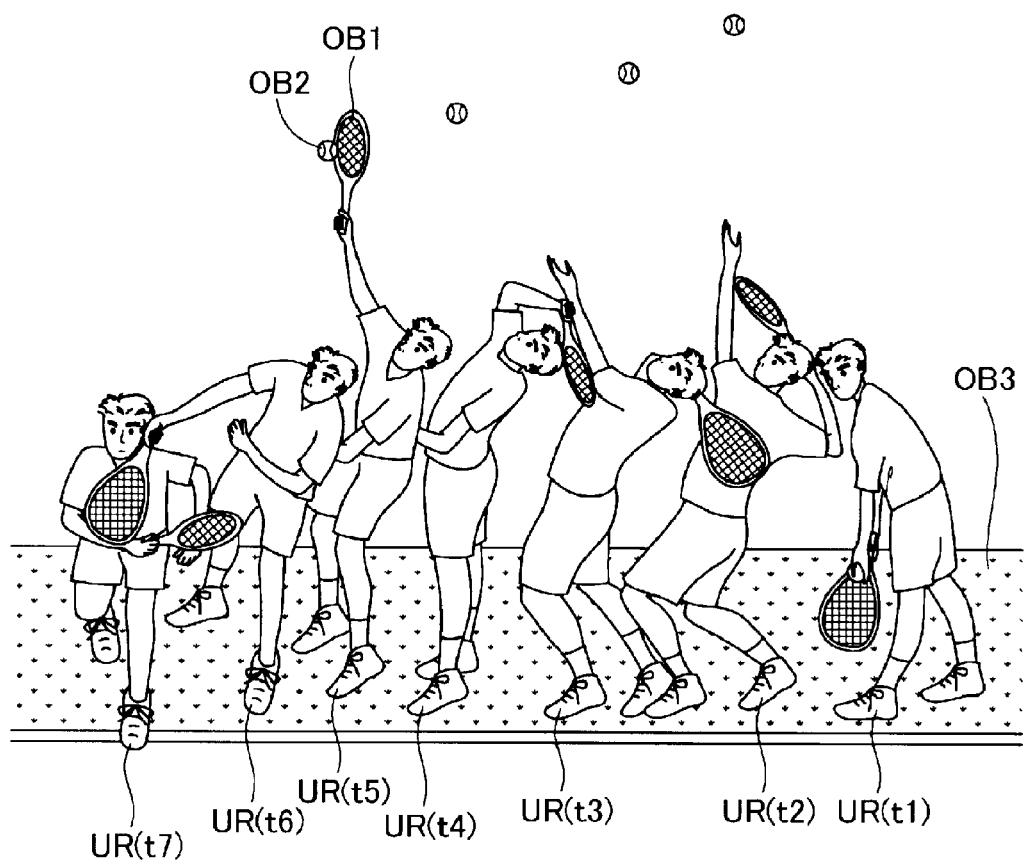
FIG. 6 is a diagram showing an example of a generated 3D model.

FIG. 6 is a diagram showing an example of the generated 3D model. In the example shown in FIG. 6, a 3D model of a continuous series of actions concerning "service of tennis" generated as a result of the procedures a1 to a5 is shown. The series of actions shown in FIG. 6 are a ball toss action at time t1, a back swing action at times t2 to t4, an impact action at time t5, and a follow-through action at times t6 and t7. In the 3D model, besides a performer UR, real objects around the performer UR such as a tennis racket OB1, a tennis ball OB2, and a coat OB3 are also 3D-modeled and included. Note that, in the 3D model generated by the 3D-model generating unit 142, unnecessary portions (e.g., a background and an object without a motion) among data of the 3D model, boundary line data, and association data of objects and a human body may be deleted. The 3D model may be a 3D model concerning a series of actions discontinuously represented at a fixed interval like a flip book. The 3D model may include, for example, icon images changing in time series, popup images, other models, images, character strings, figures, signs, and the like, sound, and any other data.

Figure 7:
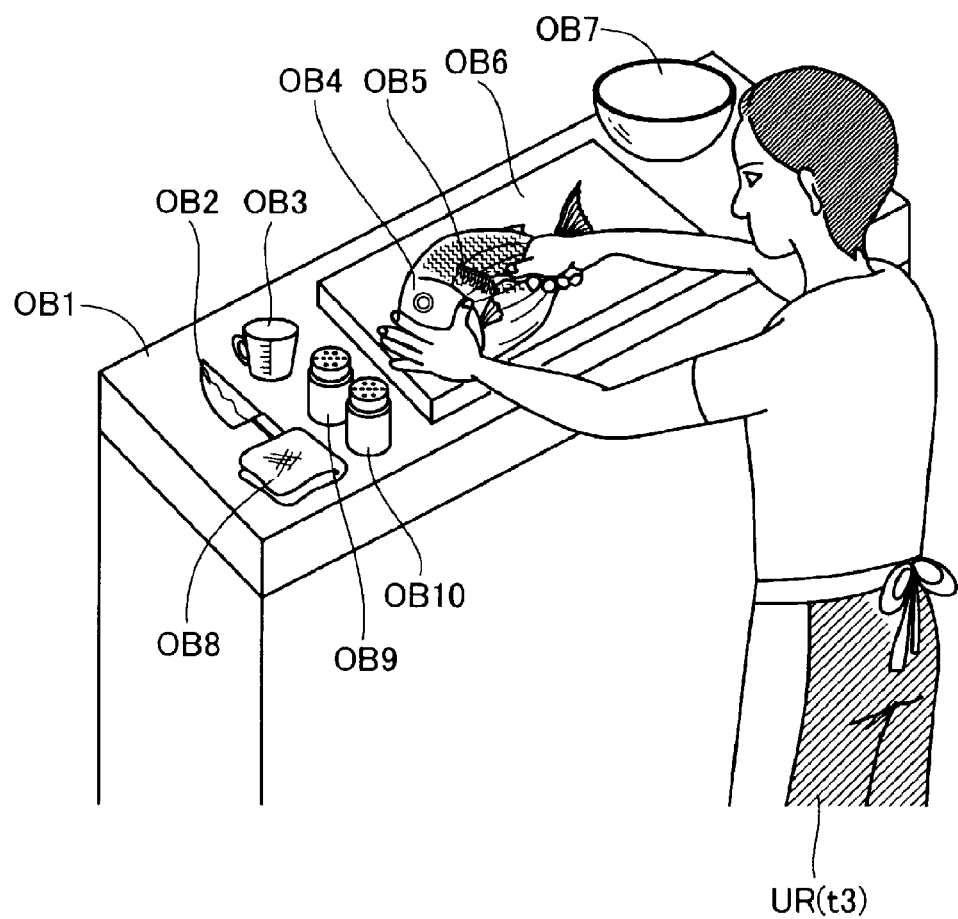
FIG. 7 is a diagram showing another example of the generated 3D model.

FIG. 7 is a diagram showing another example of the generated 3D model. In the example shown in FIG. 7, only a 3D model at time t3 in a 3D model of a series of actions concerning "filleting of a sea bream" generated as a result of the procedures a1 to a5 is shown. In the 3D model, besides the performer UR, real objects around the performer UR such as a sink OB1, a kitchen knife OB2, a measuring cup OB3, a sea bream OB4, a scale remover OB5, a chopping board OB6, a bowl OB7, a dish towel OB8, salt OB9, and pepper OB10 are also 3D-modeled and included.

Figure 8:
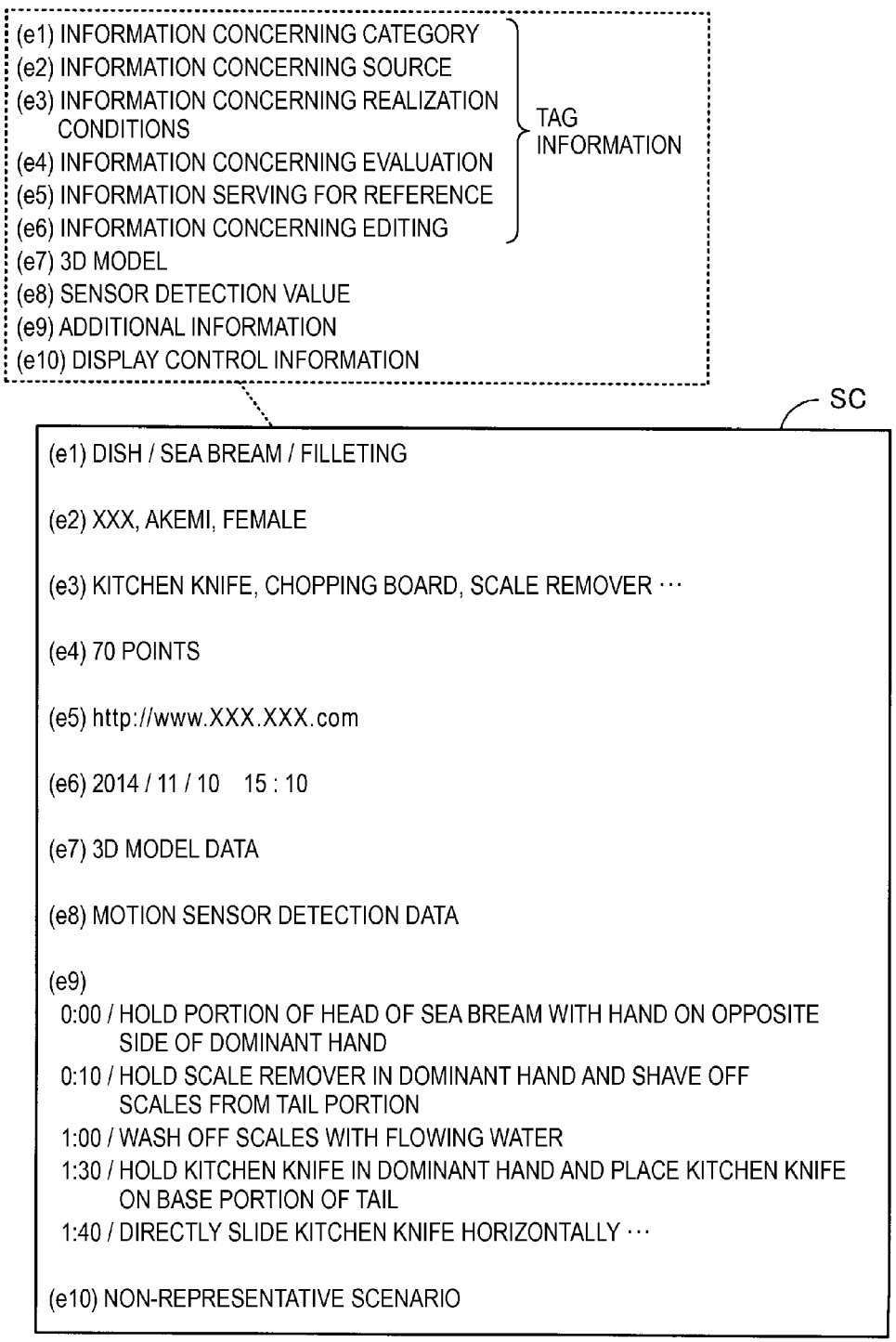
FIG. 8 is a diagram showing an example of a scenario.

FIG. 8 is a diagram showing an example of a scenario. In step S102 in FIG. 5, the generating unit 144 gives tag information to the 3D model generated in step S100. The "tag information" is information concerning a 3D-modeled series of action procedures and can include, for example, at least any one of the following elements e1 to e6 (FIG. 8).

(e1) Information concerning a category
(e2) Information concerning a source
(e3) Information concerning realization conditions
(e4) Information concerning evaluation (e5) Information serving for reference (e6) Information concerning editing The "information concerning a category" of the element e1 is information indicating to what kind of category the scenario belongs. The information concerning the category may include one or more sub-categories. The information concerning the category can include, for example, when the scenario is "cooking", at least one of a dish name, steps in a cooling procedure (preparation, preliminaries, cooking, arrangement, etc.), and the like. When the scenario is "factory work", the information concerning the category can include at least one of a part number, a product name, processes (modeling, preparation, machining, inspection, etc.), and the like.

In step S102 in FIG. 5, the generating unit 144 can acquire a category designated from the performer UR and set the category as a value of the element e1. In step S102, the generating unit 144 may perform comparison by the pattern matching or the statistical identification method using the 3D model generated in step S100 and association of categories and real objects stored in advance in the storing unit 120 to automatically calculate the value of the element e1. In this case, the generating unit 144 may extract, from a plurality of real objects obtained as a result of the comparison, a real object that should be set as a category using "presence or absence of a motion of a real object". In step S102, the generating unit 144 may convert, simultaneously with live performance of a series of actions (the procedure a1) or after the live performance, utterance content of the performer acquired by the microphone 62 into a text and automatically calculate the value of the element e1. In the example shown in FIG. 8, the scenario SC belongs to a "cooking" category, a "sea bream" category, and "filleting" category.

The "information concerning a source" of the element e2 is information concerning a creator of the scenario or a performer (a person serving as a base of a 3D model). The source may be either a person or a company. The information concerning the source can include one or more any items. The information concerning the source can include at least one of, for example, an identifier (a user ID) for identifying the creator, a name, proficiency, age, sex, height, weight, department, and years of experience of the creator, and the like of the creator.

In step S102 in FIG. 5, the generating unit 144 can acquire information stored in the user-information storing section 124 of the storing unit 120 and set the information as a value of the element e2. In the example shown in FIG. 8, a source of the scenario SC is a "female" named "Akemi" having a user ID "XXX". In this embodiment, "X" indicates any character. The same applies in the following explanation.

The "information concerning realization conditions" of the element e3 is information concerning a condition necessary for realizing the scenario. The information concerning the realization conditions can include one or more arbitrary items. The information concerning the realization conditions can include at least one of, for example, a tool, an instrument, an implement, and a facility in use, weather, temperature, humidity, a state of the ground, and the like.

In step S102 in FIG. 5, the generating unit 144 may perform comparison by the pattern matching or the statistical identification method using the 3D model generated in step S100 and association of real objects and names of the real objects stored in advance in the storing unit 120 to automatically calculate a value of the element e3. In step S102, the generating unit 144 may convert, simultaneously with the live performance of the series of actions (the procedure a1) or after the live performance, utterance content of the performer acquired by the microphone 62 into a text and automatically calculate the value of the element e3. In the example shown in FIG. 8, the information concerning the realization conditions of the scenario SC is "kitchen knife", "chopping board", and "scale remover".

The "information concerning evaluation" of the element e4 is information representing a result of a series of actions of the scenario. The information concerning the evaluation may be any information. The information concerning the evaluation can include at least one of, for example, a result of self scoring by the performer, a result of scoring by an outsider different from the performer, a measurement result (a carry, a dimension, weight, etc.), a test result (success, failure, and yield), and the like.

In step S102 in FIG. 5, the generating unit 144 can acquire input content by the performer UR and set the input content as a value of the element e4. In step S102, the generating unit 144 may convert, simultaneously with the live performance of the series of actions (the procedure a1) or after the live performance, utterance content of the performer acquired by the microphone 62 into a text and automatically calculate the value of the element e4. In the example shown in FIG. 8, the information concerning evaluation of the scenario SC is "70 points".

The "information serving for reference" of the element e5 is information serving for reference of the performer in implementing the scenario. The information serving for reference may be any information. The information serving for reference can include at least one of, for example, a URL (Uniform Resource Locator) of a WEB (World Wide Web) page, a place such as a store where an article included in the information concerning the realization conditions can be purchased, a selection method for the article included in the information concerning the realization conditions, and information for specifying other scenarios that should be referred to in order to execute the scenario SC.

In step S102 in FIG. 5, the generating unit 144 can acquire input content by the performer UR and set the input content as a value of the element e5. In step S102, the generating unit 144 may convert, simultaneously with the live performance of the series of actions (the procedure a1) or after the live performance, utterance content of the performer acquired by the microphone 62 into a text and automatically calculate the value of the element e5. In the example shown in FIG. 8, the information serving for reference of the scenario SC is a WEB page "http://www.XXX.XXX.com".

The "information concerning editing" of the element e6 is information concerning editing of the scenario. The information concerning the editing may be any information. The information concerning editing can include at least one of, for example, scenario creation date and time and information concerning division of a 3D model in the scenario.

In step S102 in FIG. 5, the generating unit 144 can acquire present date and time and set the present date and time as a value of the element e6. In the example shown in FIG. 8, the information concerning the editing of the scenario SC is "2014/11/10 15:10".

In step S104 in FIG. 5, the generating unit 144 gives sensor detection values (an element e8) and additional information (an element e9) to the 3D model generated in step S100. The sensor detection values and the additional information are time-series information incidental to the 3D model.

First, the generating unit 144 acquires detection values of various sensors during the live performance of the series of actions (the procedure a1). The various sensors are, for example, a gyro sensor, an acceleration sensor, a terrestrial magnetism sensor, a motion sensor (a sensor mounted with all of gyro, acceleration, and terrestrial magnetism sensor), a biological information acquisition sensor (a sensor for acquiring muscular strength, a sensor acquiring a pulse, a sensor for acquiring a perspiration state, a sensor for acquiring a flow of blood, etc.), a light sensor, an infrared sensor, an ultrasonic sensor, a gas detection sensor, an ion sensor, a biological sensor, a temperature sensor, a humidity sensor, and the like. These sensors may be disposed around the performer in advance. These sensors may be disposed in, for example, a device that the performer can wear (e.g., the HMD 100, a watch, a bracelet, or a ring). The generating unit 144 associates the acquired sensor detection values as information incidental to the 3D model.

Subsequently, the generating unit 144 acquires additional information and associates the acquired additional information as information incidental to the 3D model. The "additional information" is information to be added to the series of actions, in other words, an explanation of the series of actions. The additional information may be character data, may be sound data, or may be image data. The generating unit 144 can acquire the additional information using a procedure b1 or b2 explained below.

(b1) The performer inputs the additional information on a real-time basis: The performer dictates an explanation concerning the series of actions simultaneously with the live performance of the series of actions (the procedure a1). When the performer wears the HMD 100, the generating unit 144 acquires utterance content acquired by the microphone 62. When the performer wears a microphone separate from the HMD 100, the generating unit 144 acquires utterance content acquired by the microphone. The generating unit 144 associates, simultaneously with start time of utterance, the utterance content with the 3D model as sound data or character data obtained by converting the sound data into a text through sound recognition.

(b2) The performer inputs the additional information after the live performance: The performer inputs the explanation concerning the series of actions using input means such as a microphone or a keyboard after the live performance of the series of actions (the procedure a1). In this case, the performer designates, every time, an explanation at which point in time is input while reproducing data of the 3D model. The generating unit 144 associates the input sound data, character data, or image data with the 3D model together with designated time.

In the example shown in FIG. 8, during the series of actions of filleting a sea bream by the performer UR, detection data detected by the motion sensor is stored as a sensor detection value of the scenario SC. Note that detection values of a plurality of sensors may be stored in the element e8. In the example shown in FIG. 8, as the additional information of the scenario SC, the following information is stored: "hold the portion of the head of the sea bream with the hand on the opposite side of the dominant hand" is displayed immediately after the start (time 0:00), "hold the scale remover with the dominant hand and shave off scales" is displayed ten seconds after the start, and "wash off the scales with flowing water" is displayed one minute after the start. Note that the additional information of the scenario SC may be associated with the time as shown in FIG. 8, may be associated with a state of a real object (how the scales of the sea bream are shaved off), or may be associated with an action of the user (the motion of the hand or the motion of the body).

In step S106 in FIG. 5, the generating unit 144 gives display control information (an element e10) to the 3D model generated in step S100. The "display control information" includes (c1) information indicating whether the scenario is the representative scenario, (c2) information for specifying the prior scenario when the scenario is the representative scenario, and (c3) information for specifying the posterior scenario when the scenario is the representative scenario. The generating unit 144 acquires the information c1 to c3 from the performer UR and associates the information c1 to c3 with the 3D model. In the example shown in FIG. 8, since the scenario SC is not the representative scenario, the scenario SC is stored as "non-representative scenario".

In step S108 in FIG. 5, the generating unit 144 causes the scenario storing section 122 of the storing unit 120 to store the scenario generated through steps S100 to S106. In step S110, the generating unit 144 transmits the scenario generated through steps S100 to S106 to the server 300.

In step S112, the scenario registering unit 312 of the server 300 receives the scenario transmitted from the HMD 100. The scenario registering unit 312 adds a unique identifier to the received scenario and causes the scenario storing section 322 of the storing unit 320 to store the scenario.

FIG. 9 is a diagram showing an example of the scenario storing section 322 of the server 300. A plurality of scenarios transmitted from various users are stored in advance in the scenario storing section 322 of the server 300 as explained above. Unique identifiers (IDs) are given to the scenarios in step S112 of the scenario registration processing in order to distinguish the scenarios from one another. As a result, for example, in the scenario storing section 322, a plurality of scenarios having the same categories but having different realization conditions, evaluations, and the like are present like a scenario with an identifier 003 and a scenario with an identifier 004.

As explained above, according to the scenario registration processing in this embodiment, the head-mounted display device (the HMD 100) can generate the procedure information (the scenario) including the model (the 3D model) serving as the base of the virtual object representing the series of action procedures and the tag information (the elements e1 to e6) concerning the series of action procedures. The generating unit 144 of the HMD 100 can automatically extract the tag information included in the procedure information using the information (the utterance content) acquired during the generation of the model and the information prepared in advance (the information concerning the user in the user-information storing section 124).

A-5. Scenario Display Processing

Figure 10:
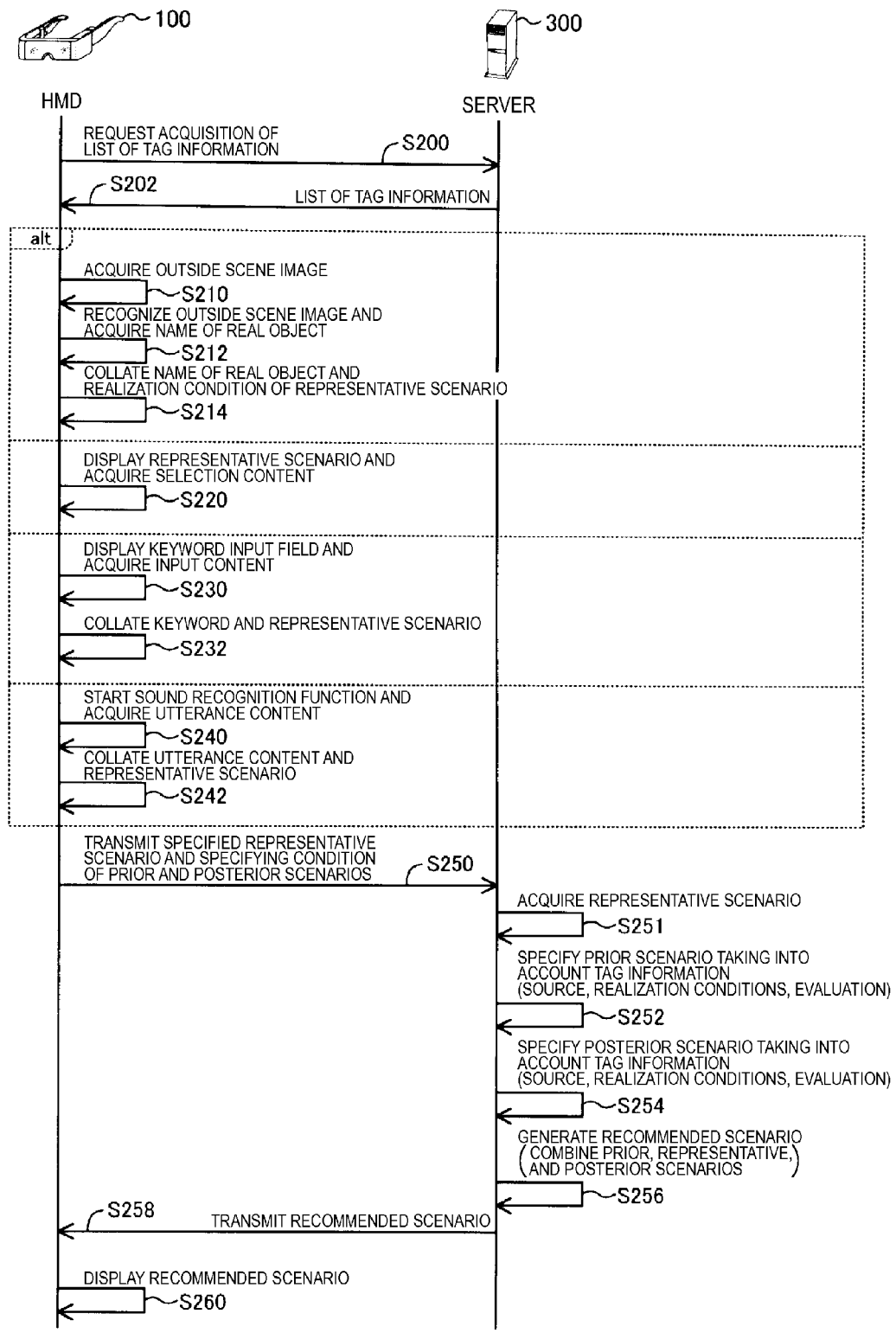
FIG. 10 is a sequence chart showing a procedure of scenario display processing.

FIG. 10 is a sequence chart showing a procedure of the scenario display processing. The scenario display processing is executed according to cooperation of the HMD 100 and the server 300. The start trigger of the scenario display processing can be optionally set. For example, a processing start request from the OS 150 of the HMD 100 or a specific application may be set as the start trigger.

In step S200, the specifying unit 146 of the HMD 100 transmits an acquisition request for a list of tag information to the server 300. In step S202, the recommended-scenario generating unit 314 of the server 300 transmits a list of tag information of representative scenarios stored in the scenario storing section 322 to the HMD 100 together with IDs of the scenarios. The representative scenarios stored in the scenario storing section 322 mean scenarios having a value "1" in a representative field in the scenario storing section 322.

Thereafter, the specifying unit 146 specifies, according to processing in steps S210 to S242, one representative scenario from the list acquired in step S202. The specifying unit 146 selectively executes a specifying method d1 by steps S210 to S214, a specifying method d2 by step S220, a specifying method d3 by steps S230 to S232, and a specifying method d4 by steps S240 to S242. Which of the specifying methods is executed may depend on designation by the user, may depend on setting performed beforehand, or may depend on a type of an application started in the HMD 100.

(d1) In step S210, the specifying unit 146 acquires an outside scene image picked up by the camera 61. In step S212, the specifying unit 146 recognizes the acquired outside scene image and extracts a real object (an object present in the real world) included in the outside scene image. The specifying unit 146 acquires a name of the extracted real object using the association of real objects and names of the real objects stored in advance in the storing unit 120. In step S214, the specifying unit 146 collates the acquired name of the real object with realization conditions of the tag information acquired in step S202. The specifying unit 146 specifies one representative scenario having the highest coincidence as a result of the collation. Note that the specifying unit 146 may collate the name of the real object with other tag information (e.g., a source, realization conditions, or evaluation).

As explained above, according to steps S210 to S214, the specifying unit 146 can specify the procedure information (the representative scenario) by acquiring, from the outside scene image in the visual field direction of the user, the real object present in the real world in the visual field direction of the user and collating the acquired real object with the tag information (the realization conditions). That is, the specifying unit 146 can specify the procedure information on the basis of the real object presumed to have already been actually seen by the user.

Figure 11:
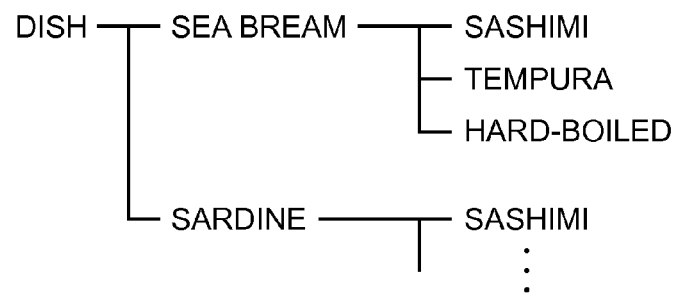
FIG. 11 is a diagram showing an example of a selection screen.

(d2) FIG. 11 is a diagram showing an example of a selection screen. In step S220 in FIG. 10, the specifying unit 146 generates a screen for the user to select the representative scenario (hereinafter referred to as "selection screen" as well) and causes the image display unit 20 to display the selection screen. The selection screen generated by the specifying unit 146 is desirably formed in a tree structure shown in FIG. 11 by merging the tag information acquired in step S202 in category units of large, medium, and small with reference to names. Consequently, the user can easily designate a desired representative scenario. The specifying unit 146 specifies one representative scenario designated by the user.

As explained above, according to step S220, the specifying unit 146 can specify the procedure information (the representative scenario) on the basis of the intention of the user. The specifying unit 146 causes the image display unit 20 to form the virtual image VI representing the list of the tag information (the large, medium, and small categories). Therefore, it is possible to improve convenience of the user in designating the tag information.

(d3) In step S230, the specifying unit 146 generates a screen for the user to input a keyword (hereinafter referred to as "input screen" as well) and causes the image display unit 20 to display the input screen. The specifying unit 146 acquires a keyword input to the input screen. In step S232, the specifying unit 146 collates the acquired keyword with the categories (the large, medium, and small categories) of the tag information acquired in step S202. The specifying unit 146 specifies one representative scenario having the largest coincidence as a result of the collation. Note that the specifying unit 146 may collate the keyword and the other tag information (e.g., the realization conditions or the evaluation).

As explained above, according to steps S230 to S232, the specifying unit 146 can specify the procedure information (the representative scenario) on the basis of the intention of the user. The specifying unit 146 can specify the procedure information on the basis of the keyword from the user. Therefore, it is possible to improve a degree of freedom of an input by the user.

(d4) In step S240, the specifying unit 146 starts a sound recognition function and recognizes utterance content acquired by the microphone 62. In step S242, the specifying unit 146 collates the utterance content with the categories (the large, medium, and small categories) of the tag information acquired in step S202. The specifying unit 146 specifies one representative scenario having the highest coincidence as a result of the collation. Note that the specifying unit 146 may collate the utterance content with other tag information (e.g., a source, realization conditions, or evaluation).

As explained above, according to steps S240 to S242, the specifying unit 146 can specify the procedure information (the representative scenario) on the basis of the intention of the user. The specifying unit 146 can specify the procedure information on the basis of the utterance content of the user. Therefore, it is possible to improve convenience of the user.

As explained above, according to the specifying methods d1 to d4, the specifying unit 146 can specify the procedure information (the representative scenario) taking into account the various kinds of information (the category, the source, the realization conditions, the evaluation, etc.) concerning the series of action procedures. When specifying the procedure information taking into account the information concerning the source, the specifying unit 146 can prioritize, for example, procedure information from a reliable source (e.g., a famous person or a famous company). When specifying the procedure information taking into account the information concerning the realization conditions, the specifying unit 146 can prioritize, for example, procedure information having realization conditions conforming to realization conditions that the user can prepare. When specifying the procedure information taking into account the information concerning the evaluation, the specifying unit 146 can prioritize, for example, procedure information with high evaluation.

In step S250, the acquiring unit 148 transmits the ID of the representative scenario specified in steps S210 to S242 and a specifying condition of incidental scenarios to the server 300. The specifying condition of the incidental scenarios is a condition to which the server 300 should refer when selecting the prior scenario and the posterior scenario. The acquiring unit 148 can adopt, for example, conditions enumerated in f1 to f4 below. The conditions f1 to f4 may be independently adopted or may be adopted in combination. Separate conditions may be designated for the prior scenario and the posterior scenario.

(f1) Condition Using the Information Concerning the Source

When this condition is adopted, the acquiring unit 148 transmits information to be used for the collation of the source (e.g., a name of a scenario creator) to the server 300 as the specifying condition of the incidental scenarios. If this condition is adopted, in the generation of the recommended scenario in the server 300, procedure information (a prior scenario and a posterior scenario) from a reliable source (e.g., a famous person or a famous company) can be prioritized.

(f2) Condition Using the Information Concerning the Realization Conditions

When this condition is adopted, the acquiring unit 148 transmits information to be used for the collation of the realization conditions (e.g., a name of a real object present in the real world in the visual field direction of the user acquired through processing same as steps S210 to S212) to the server 300 as the specifying condition of the incidental scenarios. If this condition is adopted, in the generation of the recommended scenario in the server 300, procedure information (a prior scenario and a posterior scenario) having realization conditions conforming to realization conditions that the user can prepare can be prioritized.

(f3) Condition Using the Information Concerning the Evaluation

When this condition is adopted, the acquiring unit 148 transmits information to be used for the collation of the evaluation (e.g., information to the effect that a scenario with the highest evaluation is adopted) to the server 300 as the specifying condition of the incidental scenarios. If this condition is adopted, in the generation of the recommended scenario in the server 300, procedure information (a prior scenario and a posterior scenario) with high evaluation can be prioritized.

(f4) Condition Based on an Instruction of the User

When this condition is adopted, the acquiring unit 148 acquires an instruction by the user and transmits content of the acquired instruction to the server 300 as the specifying condition of the incidental scenarios. In order to acquire the instruction by the user, the acquiring unit 148 may detect a gesture of the user using the camera 61 and acquire input content associated with the gesture or may recognize utterance content of the user input from the microphone. If this condition is adopted, in the generation of the recommended scenario in the server 300, procedure information (a prior scenario and a posterior scenario) conforming to the intention of the user can be prioritized.

In step S251, the recommended-scenario generating unit 314 of the server 300 acquires the ID of the representative scenario and the specifying condition of the incidental scenarios. The recommended-scenario generating unit 314 searches through the scenario storing section 322 on the basis of the acquired ID and acquires the representative scenario.

In step S252, the recommended-scenario generating unit 314 specifies a prior scenario from the scenario storing section 322 taking into account the tag information. Specifically, the recommended-scenario generating unit 314 executes procedures of g1 to g3 explained below.

(g1) The recommended-scenario generating unit 314 refers to the "prior scenario" of the representative scenario acquired in step S251.

(g2) The recommended-scenario generating unit 314 searches through the scenario storing section 322 and specifies one scenario having the small category designated in the prior scenario and having the specifying condition of the incidental scenarios acquired in step S251.

(g3) When a plurality of prior scenarios are designated in the procedure g1 (e.g., ID: 001 in FIG. 9), the recommended-scenario generating unit 314 repeats the procedure g2 for all the prior scenarios.

In step S254, the recommended-scenario generating unit 314 specifies a posterior scenario from the scenario storing section 322 taking into account the tag information. Specifically, the recommended-scenario generating unit 314 executes the procedures g1 to g3 explained above. In this case, the "prior scenario" is read as the "posterior scenario".

In step S256, the recommended-scenario generating unit 314 combines the prior scenario specified in step S252, the representative scenario acquired in step S251, and the posterior scenario specified in step S254 to generate a recommended scenario. In step S258, the recommended-scenario generating unit 314 transmits the generated recommended scenario to the HMD 100.

In step S260, the acquiring unit 148 of the HMD 100 acquires the recommended scenario. The acquiring unit 148 transmits the acquired recommended scenario to the augmented-reality processing unit 149 and causes the image display unit 20 to display the recommended scenario. Specifically, the augmented-reality processing unit 149 executes procedures of h1 to h3 explained below.

(h1) The augmented-reality processing unit 149 acquires an outside scene image acquired by the camera 61.

(h2) The augmented-reality processing unit 149 detects, out of real objects included in the outside scene image acquired in the procedure h1, a real object (hereinafter referred to as "target object" as well) associated with a virtual object (FIG. 8, an element e7) of the recommended scenario. For the detection, the augmented-reality processing unit 149 may use a table that associates information (e.g., a name) for specifying a real object with information for specifying a virtual object. The table is stored in advance in the storing unit 120 of the HMD 100. The table may be automatically generated by the augmented-reality processing unit 149 according to image recognition performed using the outside scene image acquired by the camera 61. The table may be generated or edited by the user of the HMD 100. In order to enable the generation or the editing of the table by the user, the augmented-reality processing unit 149 may detect a gesture of the user using the camera 61 and acquire an operation input by a command associated with the gesture or may recognize utterance content of the user input from the microphone. The augmented-reality processing unit 149 may set, as a detection target of the procedure h2, only a specific object (e.g., a real object held by the user) among the real objects included in the outside scene image. Consequently, the augmented-reality processing unit 149 can efficiently detect the real object.

(h3) The augmented-reality processing unit 149 acquires the position of the target object. The "position" includes the distance from the user and positions in the horizontal direction and the vertical direction in the visual field of the user. In this case, the augmented-reality processing unit 149 can calculate the position of the target object using both of one or more outside scene images acquired by the camera 61 and not-shown various kinds of sensors (e.g., a depth sensor and a distance measuring sensor).

(h4) The augmented-reality processing unit 149 generates image data in which the virtual object (FIG. 8, the element e7) of the recommended scenario and the additional information (FIG. 8, the element e9) are arranged to be aligned with the position of the target object acquired in the procedure h3. In the alignment, the augmented-reality processing unit 149 may use a characteristic portion (an edge, etc.) of the target object or may use a mark such as a marker attached to the target object. When arranging the virtual object, the augmented-reality processing unit 149 may apply image processing such as enlargement, reduction, rotation, and color conversion to the virtual object. Concerning one of the representative scenario and the incidental scenarios in the recommended scenario, the augmented-reality processing unit 149 may omit the arrangement of the virtual object (or the additional information) with respect to the image data. Specifically, for example, concerning the incidental scenarios, the augmented-reality processing unit 149 may omit the arrangement of the virtual object and arrange only the additional information. Consequently, it is possible to simplify guidance concerning the incidental scenarios.

(h5) The augmented-reality processing unit 149 transmits an image based on the generated image data to the image processing unit 160 and causes the optical-image display units 26 and 28 of the image display unit 20 to display the image.

In this way, the user of the HMD 100 can experience the augmented reality by viewing both of the real object present in the real world and the virtual object displayed as a virtual image on the optical-image display units 26 and 28. The virtual object in this embodiment is information used to teach a series of action procedures to the user. Therefore, according to the scenario display processing in this embodiment, it is possible to provide the user of the HMD 100 with work support that makes use of the technique of augmented reality.

As explained above, according to the scenario display processing in this embodiment, the acquiring unit 148 of the HMD 100 causes the image display unit 20 to form a virtual image representing the virtual object included in at least one of the procedure information (the representative scenario) and the incidental procedure information (the incidental scenarios: the prior scenario and the posterior scenario) acquired from the server 300. Therefore, the head-mounted display device (the HMD 100) can realize the work support that makes use of the technique of augmented reality.

Further, the acquiring unit 148 of the HMD 100 acquires at least one kind of procedure information (one representative scenario) specified by the specifying unit 146 and the incidental procedure information (the incidental scenarios: the prior scenario and the posterior scenario) incidental to the specified procedure information. The incidental procedure information is procedure information incidental to at least one of kinds of procedure information before and after the specified procedure information and, in other words, procedure information related to the specified procedure information. Therefore, the head-mounted display device (the HMD 100) can realize teaching of a series of action procedures including one action procedure (the specified procedure information) and action procedures (the incidental procedure information) related to the action procedure.

Further, according to the scenario display processing in this embodiment, the specifying unit 146 of the HMD 100 can specify at least one kind of procedure information (one representative scenario) out of a plurality of kinds of procedure information (the scenario storing section 322) using the tag information, which is the information concerning the series of action procedures (scenarios).

B. Modifications

In the embodiment, apart of the components explained as being realized by hardware may be replaced with software. Conversely, a part of the components explained as being realized by software may be replaced with hardware. Besides, modifications explained below are also possible.

Modification 1

In the embodiment, the configuration of the image display system is illustrated. However, the configuration of the image display system can be optionally decided in a range not departing from the spirit of the invention. For example, addition, deletion, and conversion of the components can be performed.

For example, the disposition of the functional units in the image display system can be optionally changed. At least apart or all of the functional units (the scenario registering unit, the recommended-scenario generating unit, and the scenario storing unit) explained as being included in the server may be included in the HMD. Similarly, at least a part or all of the functional units (the model generating unit, the generating unit, the specifying unit, the acquiring unit, and the augmented-reality processing unit) explained as being included in the HMD may be included in the server.

For example, the image display system includes the HMD and the server. However, the components of the image display system are only examples and can be optionally changed. For example, all the functions may be mounted in the HMD without providing the server. For example, instead of the HMD, a portable terminal such as a smart phone may be adopted as a display device. For example, the image display system may include other components (e.g., network devices such as a router and an access point) not illustrated above. For example, the server may be disposed in an LAN in which the HMD is disposed.

Modification 2

In the embodiment, the configuration of the HMD is illustrated. However, the configuration of the HMD can be optionally decided in a range not departing from the spirit of the invention. For example, addition, deletion, and conversion of the components can be performed.

The allocation of the components to the control unit and the image display unit in the embodiment is only an example. Various forms can be adopted. For example, forms explained below may be adopted.

(i) A form in which processing functions such as a CPU and a memory are mounted on the control unit and only a display function is mounted on the image display unit (ii) A form in which processing functions such as CPUs and memories are mounted on both of the control unit and the image display unit (iii) A form in which the control unit and the image display unit are integrated (e.g., a form in which the control unit is included in the image display unit to function as a wearable computer of an eyeglass type)

(iv) A form in which a smart phone or a portable game machine is used instead of the control unit (v) A form in which the control unit and the image display unit are connected via a wireless signal transmission line such as a wireless LAN, infrared communication, or Bluetooth and the connecting unit (a cord) is removed. Note that, in this case, power supply to the control unit and the image display unit may be implemented wirelessly.

For example, the configurations of the control unit and the image display unit illustrated in the embodiment can be optionally changed. Specifically, both of the transmitting units (Tx) of the control unit and the receiving units (Rx) of the image display unit may include a function of enabling bidirectional communication and function as transmitting and receiving units. For example, a part of the interfaces for operation (the various keys, the track pad, etc.) included in the control unit may be omitted. For example, the control unit may include other interfaces for operation such as a stick for operation. For example, the control unit may be configured to enable connection of devices such as a keyboard and a mouse thereto and receive inputs from the keyboard and the mouse. For example, the secondary cell is used as the power supply. However, the power supply is not limited to the secondary cell. Various cells can be used as the power supply. For example, a primary cell, a fuel cell, a solar cell, or a thermal cell may be used.

Figure 12A:
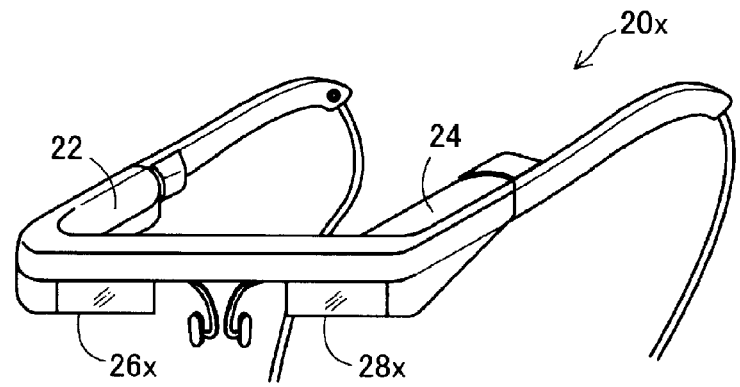
FIGS. 12A and 12B are explanatory diagrams showing the configurations of the exteriors of HMDs in modifications.
Figure 12B:
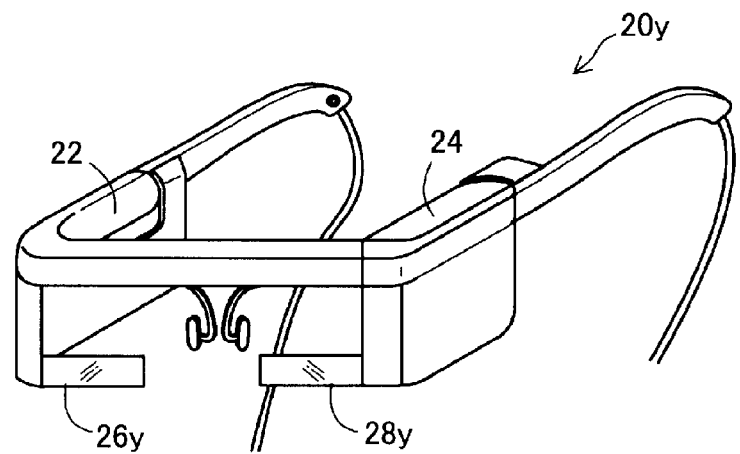

FIGS. 12A and 12B are explanatory diagrams showing the configurations of the exteriors of HMDs in modifications. An image display unit 20x shown in FIG. 12A includes a right optical-image display unit 26x and a left optical-image display unit 28x. The right optical-image display unit 26x and the left optical-image display unit 28x are formed smaller than the optical members in the embodiment and are respectively disposed obliquely above the right and left eyes of the user when the user wears the HMD. An image display unit 20y shown in FIG. 12B includes a right optical-image display unit 26y and a left optical-image display unit 28y. The right optical-image display unit 26y and the left optical-image display unit 28y are formed smaller than the optical members in the embodiment and are respectively disposed obliquely below the right and left eyes of the user when the user wears the HMD. In this way, the optical-image display units only have to be disposed near the eyes of the user. The size of optical members forming the optical-image display units is optional. The optical-image display units can also be realized in a form in which the optical-image display units cover only a portion of the eyes of the user, in other words, a form in which the optical-image display unit does not completely cover the eyes of the user.

For example, the processing units (e.g., the image processing unit, the display control unit, the model generating unit, the generating unit, the specifying unit, the acquiring unit, and the augmented-reality processing unit) included in the control unit may be configured using an ASIC (Application Specific Integrated Circuit) designed for realizing the functions.

For example, the HMD is the transmissive, or optical see-through, HMD of a binocular type. However, the HMD may be a HMD of a monocular type. The HMD may be configured as a nontransmissive HMD that blocks transmission of an outside scene in a state in which the user wears the HMD or may be configured as a video see-through HMD in which a camera is mounted on the nontransmissive HMD. For example, as the earphones, an ear hook type or a headband type may be adopted. The earphones may be omitted.

For example, instead of the image display unit worn like eyeglasses, a normal flat display device (a liquid crystal display device, a plasma display device, an organic EL display device, etc.) may be adopted. In this case, as in the embodiment, the control unit and the image display unit may be connected either by wire or by radio. Consequently, the control unit can also be used as a remote controller of the normal flat display device. For example, instead of the image display unit worn like eyeglasses, an image display unit of another form such as an image display unit worn like a cap or an image display unit incorporated in a body protector such as a helmet may be adopted. For example, the image display unit may be configured as a head-up display (HUD) mounted on vehicles such as an automobile and an airplane or other transportation means.

For example, the image-light generating unit may include components for realizing another system together with or instead of the components explained above (the backlight, the backlight control unit, the LCD, and the LCD control unit). For example, the image-light generating unit may include an organic EL (organic Electro-Luminescence) display and an organic EL control unit. For example, the image-light generating unit may include a digital micro mirror device or the like instead of the LCD. For example, the invention can also be applied to a head-mounted display device of a laser retinal projection type.

Modification 3

In the embodiment, an example of the scenario registration processing is explained. However, the procedure of the processing explained in the embodiment is only an example. Various modifications are possible. For example, a part of the steps may be omitted or other steps may be added. The order of the steps to be executed may be changed.

For example, addition, deletion, conversion, and the like may be applied to a part of the tag information given in step S102. For example, the number of sub-categories of the information concerning the category of the element e1 can be optionally determined. The sub-categories themselves may be omitted. For example, the kinds of information of the elements e2 to e6 may be realized by data of all formats such as a character string and an image.

For example, steps S104 and S106 may be omitted. When step S106 is omitted, after a scenario is registered in the server, an administrator of the server may register the element e10 (the display control information).

For example, the execution order of steps S100, S102, S104, and S106 may be changed.

Modification 4

In the embodiment, an example of the scenario display processing is explained. However, the procedure of the processing explained in the embodiment is only an example and various modifications are possible. For example, a part of the steps may be omitted or other steps may be added. The order of the steps to be executed may be changed.

For example, the specifying unit may specify a scenario without using the tag information. In this case, instead of steps S200 to S242, steps explained below are executed. The specifying unit acquires all the scenarios stored in the scenario storing unit from the server. The specifying unit causes the image display unit to display the acquired scenarios as a list and acquires selection of at least one scenario from the user. In displaying the list, the scenarios may be displayed as a tree.

For example, only the functions of a part of steps S210 to S214, step S220, steps S230 to S232, and steps S240 to S242 may be mounted on the HMD.

For example, in steps S210 to S214, step S220, steps S230 to S232, and steps S240 to S242, the HMD may specify a plurality of representative scenarios. In this case, in step S250, the HMD transmits IDs of the specified plurality of representative scenarios to the server. The server only has to specify incidental scenarios (prior scenarios and posterior scenarios) respectively concerning the received plurality of representative scenarios, generate a plurality of recommended scenarios, and transmit the plurality of recommended scenarios to the HMD.

For example, the server may omit the incidental scenarios (the prior scenario and the posterior scenario). In this case, the server only has to acquire a representative scenario designated by the HMD from the scenario storing unit and directly transmit the representative scenario to the HMD as a recommended scenario.

For example, in the scenario display processing and the scenario registration processing in the embodiment, concerning the portion explained using the description "a name of a real object", the processing may be implemented using a characteristic part of the real object instead of the name of the real object.

Modification 5

The invention is not limited to the embodiment, the examples, and the modifications explained above and can be realized as various configurations without departing from the spirit of the invention. For example, the technical features in the embodiment, the examples, and the modifications corresponding to the technical features in the forms described in the summary can be replaced or combined as appropriate in order to solve a part or all of the problems or attain a part or all of the effects. Unless the technical features are explained in this specification as essential technical features, the technical features can be deleted as appropriate.

The entire disclosure of Japanese Patent Application No. 2014-249673, filed on Dec. 10, 2015 is expressly incorporated by reference herein.

What is claimed is:

1. A head-mounted display device comprising:
   a display; and
   a processor configured to:
   extract, from an outside scene image, information representing a real object present in the real world;
   determine procedure information representing a procedure scenario, which is a series of actions, on the basis of the extracted information representing the real object;
   transmit, to a server, the determined procedure information representing the procedure scenario;
   receive, from the server, information representing another procedure scenario that is related to the determined procedure scenario and that is regarding another series of actions to be executed before or after the determined procedure scenario, wherein the another procedure scenario is determined based on at least one of: information concerning a source of the procedure scenario, information concerning a realization condition of the procedure scenario, and information concerning evaluation of the procedure scenario; and
   cause the display to display the a three-dimensional model based on at least one of the determined procedure information and the information representing the other procedure scenario.

2. The head-mounted display device according to claim 1, wherein the information representing the determined procedure scenario includes tag information concerning the series of actions.

3. The head-mounted display device according to claim 2, further comprising an image acquiring unit configured to acquire the outside scene image in a visual field direction of a user in a state in which the head-mounted display device is mounted on the head of the user, wherein the processor is further configured to:
   extract the information representing the real object by performing image recognition processing on the acquired outside scene image, and
   collate the extracted information representing the real object and the tag information to determine the procedure information.

4. The head-mounted display device according to claim 2, wherein the processor is further configured to:
   cause the display to form a virtual image representing a list of the tag information, and
   acquire a designation of the tag information from the user to specify the determined procedure information.

5. The head-mounted display device according to claim 2, wherein the processor is further configured to:
   acquire an input of a keyword from the user, and
   collate the acquired keyword and the tag information to specify the determined procedure information.

6. The head-mounted display device according to claim 2, further comprising a sound acquiring unit configured to acquire utterance content of the user, wherein the processor is further configured to: collate the acquired utterance content and the tag information to specify the determined procedure information.

7. The head-mounted display device according to claim 2, wherein the tag information includes the at least one of: the information concerning the source of the series of actions, the information concerning the realization condition of the series of actions, and the information concerning the evaluation of the series of actions, and the server is further configured to: specify the determined procedure information based on at least one of: the information concerning the source, the information concerning the realization condition, and the information concerning the evaluation.

8. A method of controlling a head-mounted display device, comprising:
   extracting, by the head-mounted display device, from an outside scene image, information representing a real object present in the real world;
   determining procedure information representing a procedure scenario, which is a series of actions, on the basis of the extracted information representing the real object;
   transmitting, by the head-mounted display device to a server, the determined procedure information representing the procedure scenario;
   receiving, by the head-mounted display device from the server, information representing another procedure scenario that is to be executed before or after the procedure scenario and that is related to the procedure scenario, wherein the other procedure scenario is determined by the server based on at least one of: information concerning a source of the procedure scenario, information concerning a realization condition of the procedure scenario, and information concerning evaluation of the procedure scenario; and
   causing, by the head-mounted display device, a display to display a three-dimensional model based on at least one of the determined procedure information and the information representing the other procedure scenario.

9. A non-transitory computer readable medium comprising computer program instructions that, when executed by a computer of a head-mounted display, cause the computer to:
   extract, from an outside scene image, information representing a real object present in the real world;
   determine procedure information representing a procedure scenario, which is a series of actions on the basis of the extracted information representing the real object;
   transmit, to a server, the determined procedure information representing the procedure scenario;
   receive, from the server, information representing another procedure scenario that is to be executed before or after the procedure scenario and that is related to the procedure scenario, wherein the other procedure scenario is determined by the server based on at least one of: information concerning a source of the procedure scenario, information concerning a realization condition of the procedure scenario, and information concerning evaluation of the procedure scenario; and cause a display to display a three-dimensional model based on at least one of the determined procedure information and the information representing the other procedure scenario.

10. The head-mounted display device according to claim 1, wherein the processor is further configured to:

cause the display to display information regarding the procedure scenario and the other procedure scenario;

determine, based on user input, a user selection of at least one of the procedure scenario and the other procedure scenario;

cause the display to display the three-dimensional model of the selected at least one of the procedure scenario and the other procedure scenario.

11. The head-mounted display device according to claim 1, wherein data of the 3D model is data concerning a performer of the scenario and real objects present in the real world around the performer.

12. The head-mounted display device according to claim 11, wherein the 3D model includes time-series information concerning the motion of the performer.

13. The head-mounted display device according to claim 1, wherein the processor is further configured to:

collate an acquired name of the real object with realization conditions of acquired tag information of a plurality of scenarios; and specify one representative scenario having the highest coincidence of the plurality of scenarios as a result of the collation.

14. The head-mounted display device according to claim 1, wherein the processor is further configured to:

cause the display to display a selection screen for the user to select a representative scenario from a plurality of scenarios;

receive a user selection of the representative scenario; and transmit, to the server, information representing the representative scenario, as the determined procedure information.

15. The head-mounted display device according to claim 1, wherein the processor is further configured to: transmit, to the server, the ID of procedure scenario and a specifying condition of incidental scenarios.

16. The head-mounted display device according to claim 1, wherein the processor is further configured to:

transmit, to the server, a request for acquisition of a list of tag information for a plurality of scenarios, the tag information including a scenario identifier; and receive, from the server, the list of tag information as the information representing the other procedure, and as information regarding the procedure scenario.

* * * * *